US007203700B1

(12) United States Patent
Kumar et al.

(10) Patent No.: US 7,203,700 B1
(45) Date of Patent: Apr. 10, 2007

(54) ONLINE INSTANCE ADDITION AND DELETION IN A MULTI-INSTANCE COMPUTER SYSTEM

(75) Inventors: Raj Kumar, Brooklyn, NY (US); Jonathan Creighton, Oakland, CA (US); Alok K. Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 828 days.

(21) Appl. No.: 09/945,118

(22) Filed: Aug. 31, 2001

(51) Int. Cl.
*G06F 17/00* (2006.01)
*G06F 9/44* (2006.01)
*G06F 17/30* (2006.01)
*G06F 12/00* (2006.01)
*G06F 15/16* (2006.01)

(52) U.S. Cl. ...................... 707/103 R; 707/1; 707/200; 717/100; 717/116; 709/203

(58) Field of Classification Search ........ 717/107–108, 717/116, 171, 106, 170–177, 164–166, 120–121, 717/100, 110; 719/315–316; 710/33; 709/203, 709/217, 220; 707/103 R, 1, 200; 718/107, 718/100, 1
See application file for complete search history.

(56) References Cited

U.S. PATENT DOCUMENTS

| | | | | |
|---|---|---|---|---|
| 5,341,478 | A * | 8/1994 | Travis et al. | 709/203 |
| 5,421,012 | A * | 5/1995 | Khoyi et al. | 718/107 |
| 5,596,745 | A * | 1/1997 | Lai et al. | 707/103 R |
| 5,603,031 | A * | 2/1997 | White et al. | 719/317 |
| 5,692,183 | A * | 11/1997 | Hapner et al. | 707/103 R |
| 6,070,006 | A * | 5/2000 | Iriuchijima et al. | 717/108 |
| 6,185,198 | B1 * | 2/2001 | LaDue | 370/329 |
| 6,189,138 | B1 * | 2/2001 | Fowlow et al. | 717/107 |
| 6,230,309 | B1 * | 5/2001 | Turner et al. | 717/107 |
| 6,275,828 | B1 * | 8/2001 | Lee et al. | 717/116 |
| 6,298,480 | B1 * | 10/2001 | Beuk et al. | 717/171 |
| 6,438,616 | B1 * | 8/2002 | Callsen et al. | 719/316 |
| 6,529,947 | B1 * | 3/2003 | Feuerman | 709/217 |
| 6,557,054 | B2 * | 4/2003 | Reisman | 710/33 |

(Continued)

OTHER PUBLICATIONS

Oracle8i Parallel Server Concepts, Release 2 (8.1.6), Dec. 1999, Part No. A76968-01, available from Oracle Corporation, Redwood Shores, California (pp. 3-1 to 3-8, 4-1 to 4-14. 5-1 to 5-34, 6-1 to 6-6, 7-1 to 7-9, and 9-1 to 9-26).

(Continued)

*Primary Examiner*—Antony Nguyen-Ba
(74) *Attorney, Agent, or Firm*—Silicon Valley Patent Group LLP; Omkar Suryadevara

(57) ABSTRACT

A new instance of an application is added to a group of existing instances (of that application) that share a resource, such as a database. The new instance is added by creating a new object for the new instance by cloning an existing object of an existing instance in the group, setting up connectivity between the new instance and a network through which the multiple instances communicate with one another, and starting up the new instance. The just-described acts are performed in the reverse order when deleting an existing instance. Each of these acts may be performed manually, or automatically without user input, with the user issuing at least one instruction to add or delete an instance.

20 Claims, 16 Drawing Sheets

U.S. PATENT DOCUMENTS

| | | | | |
|---|---|---|---|---|
| 6,591,272 | B1 * | 7/2003 | Williams | 707/102 |
| 6,640,255 | B1 * | 10/2003 | Snyder et al. | 719/315 |
| 6,651,140 | B1 * | 11/2003 | Kumar | 711/118 |
| 6,694,506 | B1 * | 2/2004 | LeBlanc et al. | 717/108 |
| 6,714,962 | B1 * | 3/2004 | Helland et al. | 709/203 |
| 6,789,252 | B1 * | 9/2004 | Burke et al. | 717/100 |
| 6,820,267 | B2 * | 11/2004 | Christensen et al. | 719/315 |
| 6,826,523 | B1 * | 11/2004 | Guy et al. | 703/22 |
| 6,862,617 | B1 * | 3/2005 | Wu | 709/224 |
| 6,915,338 | B1 * | 7/2005 | Hunt et al. | 709/220 |
| 6,968,538 | B2 * | 11/2005 | Rust et al. | 717/108 |
| 2003/0115297 | A1 * | 6/2003 | Branson et al. | 709/220 |
| 2004/0168174 | A1 * | 8/2004 | Baker | 719/310 |

OTHER PUBLICATIONS

"Adding Additional Nodes to a Cluster" on p. 9-7 of Oracle 8i Parallel Server Setup and Configuration Guide, Release 2 (8.1.6), Dec. 1999, Part No. A76934-01 (pp. 9-1 9-7).

* cited by examiner

ONLINE INSTANCE ADDITION AND DELETION IN A MULTI-INSTANCE COMPUTER SYSTEM

BACKGROUND

A cluster is a group of independent computers working together as a single system. In a client/server environment, client computers interact with a cluster as though it were a single entity, a single high-performance, highly reliable server. If one computer in a cluster fails, its workload can be automatically distributed among the surviving computers. Computers in a cluster may be used to execute the software instructions of an application (also called "parallel application") in parallel. Examples of parallel applications include database servers, application servers, data mining tools, decision support systems, computer-aided-design tools, gene sequencing tools, seismic (earthquake prediction) tools and modeling tools (e.g. climate, combustion, reservoir, structure, molecules, nuclear).

Oracle Parallel Server (OPS) adds parallel technology to the Oracle8i™ database, to enable multiple instances (e.g. Instance1 and Instance2 in FIG. 1) of the database server to execute on computers of a cluster and concurrently access a single shared database that may be resident in an array 5 of disks. Disk storage array 5 provides fault tolerant disk components. Each computer acts as a single node in the configuration. Every computer in a cluster can be connected to a shared array 5 of disks as well as its own local disk 6. All of the computers in the cluster have concurrent read/write access to the data stored on the shared disks. The Oracle Parallel Server (OPS) is described in detail in Oracle8i Parallel Server Concepts, Release 2 (8.1.6), December 1999, Part No. A76968-01, available from Oracle Corporation, Redwood Shores, Calif., and incorporated by reference herein in its entirety.

If one computer in an Oracle™ Parallel Server fails, the other computers still have uninterrupted access to the data stored on the shared disks. The surviving computer(s) automatically perform recovery by rolling back any incomplete transactions that the failed computer was attempting. This ensures the logical consistency of the database. Disk mirroring of the shared disk drives can also be used to minimize the effect of a disk failure. With disk mirroring, a duplicate copy of the contents of the disk is kept on a different physical drive. If a particular disk fails, the cluster software transparently switches to the mirrored copy of the disk and processing continues.

Typically, a single instance of a database process (also called "Oracle instance") is executing on each of the computers (also called "nodes") that form a cluster. An Oracle instance is composed of processes and shared memory. Within the shared memory is a buffer cache for the Oracle instance. The buffer cache contains disk blocks and improves performance by eliminating disk I/O. Since memory cannot be shared across nodes in a cluster, each Oracle instance contains its own buffer cache. A parallel cache manager (PCM) coordinates access to data resources required by the Oracle instances.

In addition to the buffer cache, several other resources require coordination by Oracle Parallel Server across instances, including dictionary, rollback segments and redo logs. Another component is Cluster Group Services (CGS) that interacts with a Cluster Manager (CM) to track cluster node status and keeps the database aware of which nodes forms an active cluster. The Cluster Manager is a vendor-supplied component specific to the hardware and OS configuration, and unrelated to a database.

Also, Oracle8i provides a load-balancing feature to distribute connections from client computers across the cluster, maximizing transaction throughput and minimizing response time. Load balancing requires monitoring resource utilization levels on each node in the cluster, and directing the client connections to the least loaded cluster node. In the event of a failure of node 8 (FIG. 1), Oracle Parallel Server can failover a connection with a client 7 to a functioning and least loaded node 9 of the cluster. This is done transparently, i.e., without user knowledge or intervention in the case of query operations.

Oracle8i supports high user populations by using Oracle Multithreaded Server (MTS) configuration. MTS is based on a database resource sharing architecture where processes called "listeners" route client connections to a group of other processes called "dispatchers" that interact with server processes to handle the connections. Oracle Parallel Server environments can be configured with MTS, where each node in the cluster is configured with one or more dispatchers (such as D1 for Instance1 in node 8, and D2 and D3 for Instance2 in node 9, as illustrated in FIG. 1). In Oracle8i, the listeners (such as L1 and L2 in FIG. 1) can be configured locally or on remote nodes to provide greater scalability and system availability.

To facilitate load balancing, Oracle instances on each node register with and communicate with all the listeners regarding CPU utilization in each node. Implementation phases for load-balancing in the example of FIG. 1 include: client connections are distributed in a random fashion across available listeners, L1 and L2. The randomized load balancing policy ensures that client requests are spread efficiently across available listeners. Assume that L1 was chosen to receive the client request. Listener L1 compares the CPU load on the two computers.

If the second computer (containing dispatchers D2 and D3) is less loaded, listener L1 chooses the second computer. This allows the least loaded node to process incoming client connections. The listener L1 then compares the load, or active connections, on the dispatchers, D2 and D3. If Dispatcher D2 is less loaded than Dispatcher D3, listener L1 will choose to direct the client request to Dispatcher D2. This allows the dispatcher with the least number of active connections to process the incoming client connections.

When one or more new instances are to be added to Oracle Parallel Server during operation, one may bring down the database and recreate the entire database from scratch with new instances included. For example, see "Adding Additional Nodes to a Cluster" on page 9–7 of Oracle8i Parallel Server Setup and Configuration Guide, Release 2 (8.1.6), December 1999, Part No. A76934-01 that is incorporated by reference herein in its entirety.

SUMMARY

A new instance of an application is added to a group of existing instances that share a resource, such as a database. The new instance is added by creating a new object for the new instance by cloning existing objects of an existing instance in the group, setting up connectivity between the new instance and a network through which the multiple instances communicate with one another, and starting up the new instance. Each of these acts is performed automatically without user input, once the user issues an instruction to add the new instance.

DETAILED DESCRIPTION

In accordance with the invention, a new instance is added to a group of instances that are executing in a number of computers, in the following manner. Environment for the new instance is created, e.g. based on a template which may be predetermined or based on an existing instance. Specifically in one embodiment, one or more objects required by the new instance is obtained by copying and renaming (in an act known as "cloning") a corresponding object of an instance that is currently existing in the group, as illustrated in act 10 of FIG. 2.

In one embodiment, act 10 is performed automatically, by one of the multiple computers, in response to a user's instruction to add the new instance. Moreover, connectivity between the new instance and the group of instances is also set up (automatically in this embodiment) as illustrated by act 20, and the instance is started as illustrated by act 30 (again automatically in this embodiment).

Figure 1:
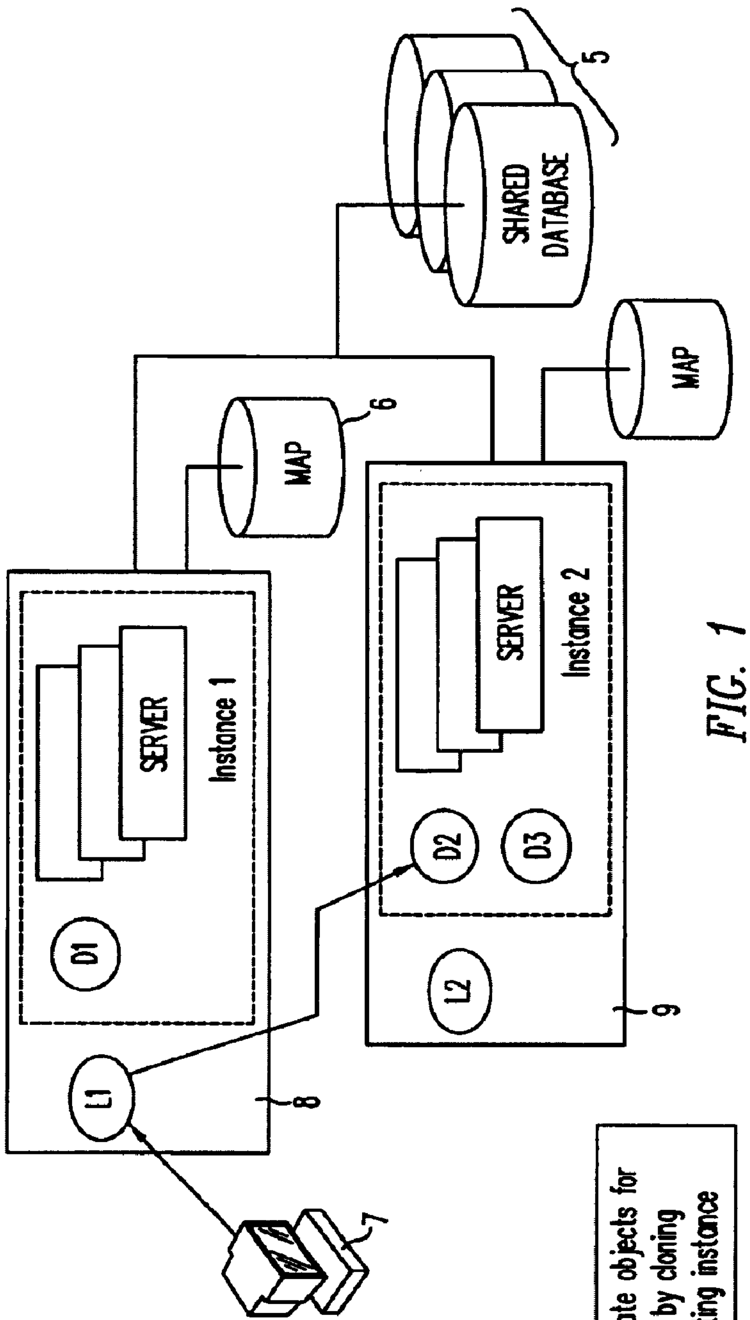
FIG. 1 illustrates, in a block diagram, a cluster of computers executing multiple instances of a database server in the prior art.
Figure 2:
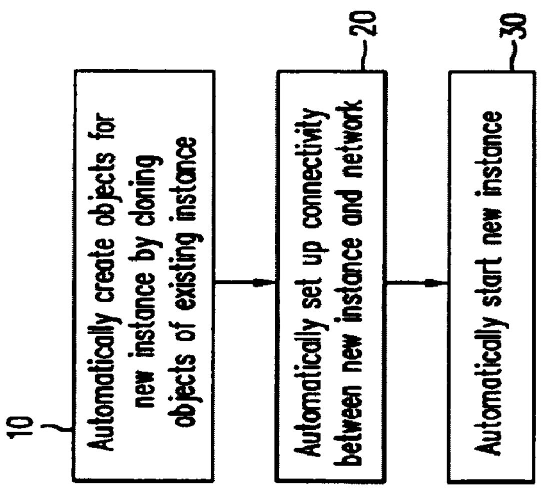
FIG. 2 illustrates, in a flow chart, acts performed by a computer programmed in accordance with the invention.

Although acts 10, 20 and 30 are illustrated in FIG. 2 in a specific sequence, this is just one embodiment, and in other embodiments other sequences may be used. In another embodiment, the order of acts 10 and 20 can be reversed, e.g. the connectivity may be set up prior to creation of the objects needed by the new instance. Moreover act 30 may be performed first and the new instance can trigger the execution of (and wait on) acts 10 and 20, or alternatively the new instance may itself perform acts 10 and 20.

Furthermore, objects 43I (FIG. 3) of any existing instance can be used to create the cloned objects 43J, depending on the embodiment. In one specific embodiment, objects 43I belong to an instance in a computer that performs acts 10, 20 and 30, i.e. a local instance. However, in other embodiments, instances in other computers may be used when performing cloning. For example, a user may be queried as to which instance happens to be the most similar to the new instance to be created, and thereafter such an instance's objects may be cloned.

As used herein, the term "instance" denotes any process (or group of processes) among a number of processes that execute (in the same processor or in different processors) the same software instructions, and that perform data processing, using a shared resource, such as a database. However, instances as used herein are not limited to sharing a database, and instead may share other kinds of resources that are normally shared in a parallel application of the type described above. Depending on the embodiment, such instances may receive and work on portions of a single task, such as a single query to the database, if such a task can be subdivided.

Also depending on the embodiment, such instances may need to coordinate with one another, and exchange partial results from time to time. Furthermore, depending on the embodiment, such instances may maintain data separate and distinct from the data of other instances (e.g. in their respective local disks), so that the other instances cannot access such data. Also depending on the embodiment, the just-described data may be a database, so that each instance has its own database (also called "database partition") which other instances cannot access, although all database partitions share the same system directories. Such instances may also have security features separate and distinct from security features of other instances. As noted above, multiple instances may execute in the same computer, although in one embodiment illustrated in FIG. 3 there is only one instance in each computer.

Regardless of the embodiment, each of the above-described instances share a resource 41 (FIG. 3) among each other, and such a shared resource may be, for example, data that is being processed by each of the instances, as in the case of a database server, or alternatively can be software that is being served out to various client computers, as in the case of an application server. In alternative embodiments, shared resource 41 need not be in the form of information (i.e. code and/or data) and instead may be some hardware, such as networking equipment.

A shared resource of one embodiment is a physical file, which is commonly shared among each of the instances. Depending on the implementation, software for implementing a cluster may include a distributed lock manager that arbitrates access to such a shared resource. However, in an alternative embodiment, nothing is physically shared by the instances, and instead the instances logically share data so that the data as a whole has the appearance of a shared resource although individual pieces of the data are maintained by each instance. For example, if there are two instances A and B, the first instance A may maintain five pieces of data, and the second instance B may maintain another five pieces of data, and when the data piece maintained by instance B needs to be accessed and used in some manner by instance A (e.g. for reading or writing), instance A communicates with instance B to perform the operation, and instance B performs the operation on behalf of instance A. In this manner, in this example the ten pieces of data together form a single shared resource available to each of the two instances.

Figure 3:
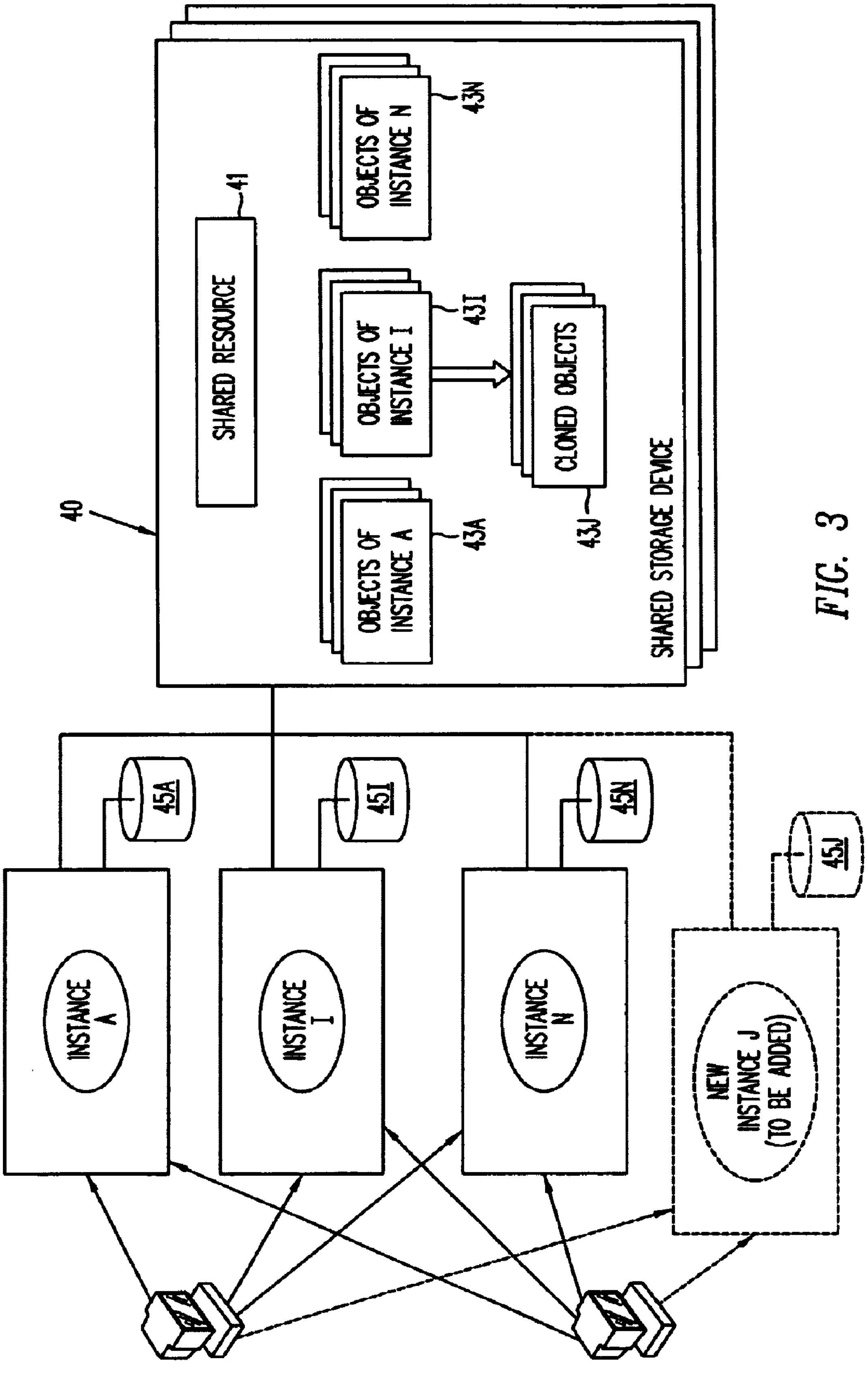
FIG. 3 illustrates, in a high-level block diagram, a cluster of computers including a computer that performs the acts of FIG. 2 to add a new instance to a group of existing instances of an application program, in one embodiment.

As noted above, in addition to the shared resource each of the instances can maintain other information that is separate from corresponding information of other instances, and such instance-specific information may be held in one or more objects 43A–43N (wherein A≦I≦N, wherein N is the total number of objects) with each object 43I being used by a single instance I (FIG. 3.). Although a group of three objects is labeled as 43I in FIG. 3, such a group may contain a single object, or any number of objects, depending on the implementation. Such objects are cloned in act 10 described above in reference to FIG. 2, to form the cloned objects 43J for use by a new instance J. Although objects 43A–43N and 43J are illustrated as being physically located in a shared storage device 40 (FIG. 3), depending on the implementation each individual group of objects may be located physically on a storage device that is accessible only by corresponding instance, such as disks 45A–45N and 45J, of the respective instances A–N and J.

In act 20 (FIG. 2) connectivity between the new instance J (FIG. 3) and at least one component in a network of computers is established, in any manner, depending on the embodiment. For example, client computers 48 and 49 (FIG. 3) may be informed of the new instance J so that processes therein can start sending work (as illustrated by the dashed lines) to the new instance. Thereafter, as illustrated by act 30 (FIG. 2), the new instance is started, for example by issuing an operating system instruction to the computer in which the instance J is to be started. As noted above, such a computer may be part of a cluster of computers in which all of the other instances are executing. Depending on the embodiment, all of the above-described instances may be executing in a single computer, or alternatively in computers connected to one another by a local area network or a wide area network.

Automatic addition of a new instance to a group of existing instances as described above in reference to FIG. 2 provides several advantages. Specifically, depending on the embodiment, manual effort in adding a new instance is reduced or even eliminated. Moreover, human errors in a manual process are also reduced or eliminated, thereby to facilitate guaranteed 24×7 uptime. Furthermore, it is no longer necessary to bring down all of the instances of an application, because a new instance can be automatically added on the fly, namely while the other instances are continuing execution.

This feature of adding a new instance on the fly also facilitates guaranteed 24×7×365 uptime without interruption, and helps to meet increasing workload challenges. Therefore, the process described above in reference to FIG. 2 addresses application availability and scalability issues, without ever requiring that existing instances of an application be recycled.

In one specific embodiment, acts 10, 20 and 30 are preceded by one or more preliminary acts 50 (FIG. 4), which may or may not be performed in other embodiments. In the specific embodiment illustrated in FIG. 4, a user instructs a computer (also called "starter computer") to automatically add a new instance to a group of instances of an application. The starter computer may initially consult a data structure (which may be present in the starter computer itself) that identifies all of the hardware resources in a cluster, e.g., a hardware resource profile, to identify a list of computers (also called "nodes") in the cluster.

Thereafter, as illustrated by act 51 (FIG. 4), the starter computer displays the list to a user. The list displayed can be the entire list of all computers in the cluster, or alternatively the starter computer may prune the list to delete the computers in which an instance is currently executing, thereby to obtain a pruned list that identifies only the computers that do not have any instances. Thereafter, in act 52, the starter computer receives from the user the identity of one of the computers in the displayed list in which a new instance is to be added (also called "newbie computer").

Depending on the embodiment, act 51 may be omitted, e.g. if the user's identification of a newbie computer received in act 52 is thereafter automatically verified to ensure that the newbie computer belongs to the cluster. If no list is displayed (because act 51 is omitted), the newbie computer may not belong to the cluster, in which case such a computer may be added to the cluster in the normal manner, if the user desires. For example, the newbie computer's hardware may be manually connected to the hardware of the existing cluster (including formation of electrical connections and network interconnects, shared disk subsystem connections and so on) installing the cluster software on the newbie computer, and if necessary creating raw devices or alternatively supporting a cluster file system.

Next, in act 53, the starter computer automatically checks that the network has connectivity to the newbie computer, e.g. confirms that one or more processes that implement connectivity of the newbie computer to other processes in other computers of the network are up and running, and are responsive to messages being sent to the newbie computer from the network.

Thereafter, in act 54, the starter computer checks to see if the newbie computer already contains access to software to be executed by the new instance. For example, the software may be available to the newbie computer through a cluster file system. Alternatively, the software may be automatically installed in the newbie computer (by the starter computer) if a cluster file system is not used, or alternatively if the software is not individually present in a local disk of the newbie computer. If the starter computer contains an instance executing therein, the starter computer can copy its own software to the newbie computer (if necessary), and alternatively may copy the software from another computer that contains an instance and therefore has access to the software (such a computer may be identified from a map which is discussed below in reference to act 21).

Thereafter, in act 55, the starter computer automatically sets up resources needed by the new instance in the newbie computer. Examples of such resources include a directory that may be required by the new instance during execution, to write log files, and/or to save data temporarily to disk. The resources that may be set up in act 55 include any resources (such as memory of a minimum size) needed to bootstrap the instance of the application, so that the new instance of the application can come into existence (also called "static configuration"). Such resources may also include state information, and/or initialization values that may be needed by the new instance.

Static configuration includes any information that remains in existence even after the power is turned off to the computer that has one or more instances executing therein. Therefore static configuration is normally held in non-volatile memory. Static configuration also includes a shared map, as well as bootstrap configuration of the type described above. In contrast, run time configuration includes information that disappears when the power is turned off, and includes, for example, database objects for an instance of the database.

Act 55 may be omitted, depending on the embodiment, for example if the new instance is an autodiscovery process which is stateless. Specifically, one or more of the above-described acts 51–55 may therefore be omitted, depending on the embodiment and depending on the circumstances For example, the newbie computer may have been previously set up during the initial formation of a multi-instance group to be executed on the cluster. If so, all of acts 50 may be skipped. Another example uses a cluster file system, thereby to eliminate act 54. Moreover, if the newbie computer can be identified via a file or environment variable, acts 51 and 52 can be eliminated. Furthermore, although acts 53–55 of one embodiment are performed automatically, in other embodiments such acts may be performed only after seeking and obtaining approval from the user. Therefore, in response to user disapproval one or more such acts 53–55 may be skipped.

Figure 4:
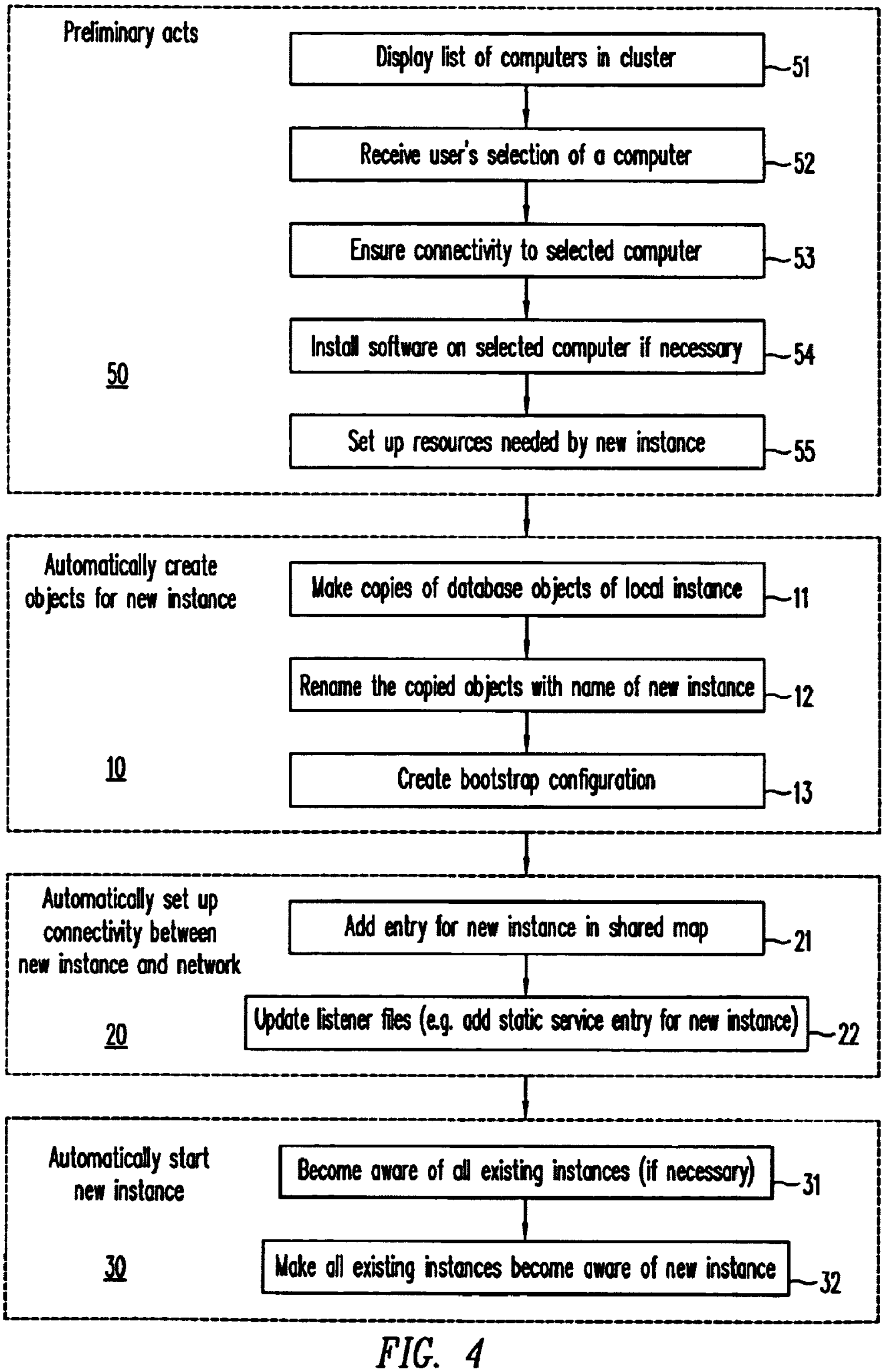
FIGS. 4 and 6 illustrate, in flow charts, one embodiment for respectively adding and deleting an instance of a database application.

In this embodiment, act 10 of (FIG. 4) is implemented by making copies (as illustrated by act 11) of one or more database objects of an instance named in the shared map (which is discussed below in reference to act 21), e.g. redo log groups, and either rollback segments or undo table space, that are normally required to access the shared resource such as a database. The copied objects are renamed with the name of the new instance, as illustrated by act 12 (FIG. 4). Note that the copied objects need not be renamed, e.g. if a table or other mapping is maintained, to identify a specific object as being used by a specific instance. Thereafter, in act 13, a bootstrap configuration is created for the new instance, for use in determining system resources (such as memory size) to be used by the new instance.

In this particular embodiment, in act 20, the starter computer sets up connectivity between the new instance and the network by adding an entry (see act 21 in FIG. 4) for the new instance in a shared map, which identifies a mapping between instances and computers in the cluster. For example, the shared map may be implemented as a table of port numbers at which the instances are listening for messages from the network and Internet addresses on the computers in which the instances are executing.

Specifically, in this embodiment, each of computers 60A–60N (FIG. 5) of cluster 61 are identified in single map 62 that is present in a shared storage device 40, such as a hard disk. Such a shared map 62 identifies each of the instances A–N that is executing on the respective computers 60A–60N. Use of a shared map eliminates the need for each of a number of maps of the prior art to be individually updated in each computer of a cluster. Moreover, use of a shared map 62 as described herein effectively enables management tools to inform even an instance I that is currently down. Specifically, when instance I coms up, it recognizes that a new instance J was added while instance I was down. Advantages of a single shared map include: (1) every instance has the same information and (2) when the map is updated, every instance has the updated information instantly (without delay otherwise resulting from propagation of the update).

In one embodiment, shared map 62 is used only for discovery purposes. Specifically, a tool that is used to start up a new instance uses shared map 62. Shared map 62 may also be used to provide a status check and/or for monitoring of the instances. Instances themselves do not use shared map 62 in this embodiment, and instead the instances (e.g. when they start up) register in a group (for the application) of a cluster group service (which is software of a cluster layer) to discover each other.

Figure 5:
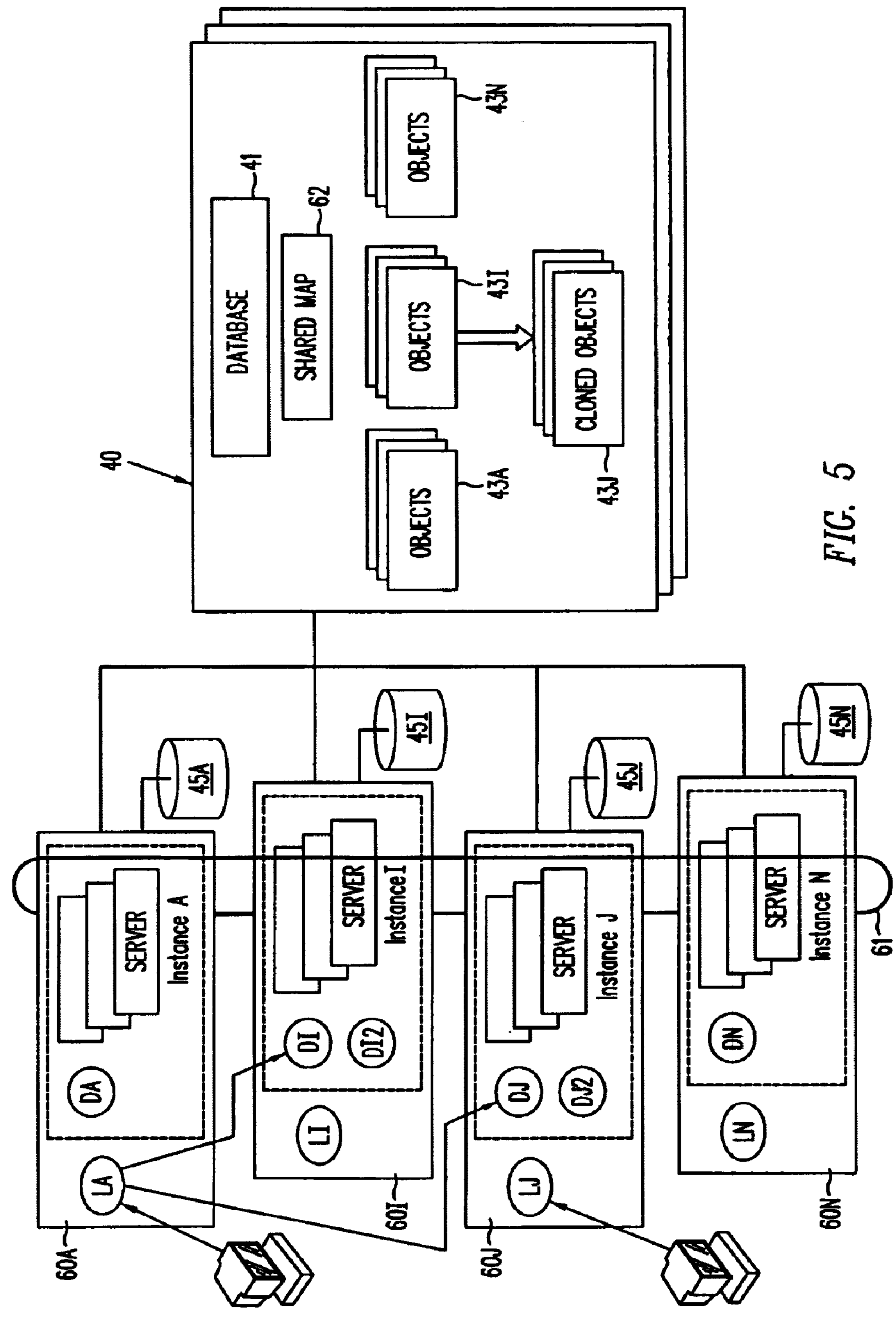
FIG. 5 illustrates, in a low-level block diagram, one implementation of the embodiment illustrated in FIG. 3.

In one specific implementation illustrated in FIG. 5, each of computers 60A–60N also contains a number of listeners LA–LN of the type described above. And for this reason, in act 22, a listener file in newbie computer 60J is updated to add a static service entry for the new instance J in computer 60J. When the new instance J starts, it registers with the listener defined in the listener file.

In one implementation, a file (also called "initialization parameter" file) that is used for bootstrap configuration identifies two kinds of entries: (a) global entries for use in starting up all instances, and (b) instance-specific entries that may be cloned from another instance for use with the new instance. The initialization parameter file can be private to each computer in the cluster, or alternatively can be shared by all computers in the cluster.

Depending on the example, the instance-specific entries may be changed to make the new instance more powerful or less powerful than a previous instance, instead of merely cloning the entries of the previous instance. Such changes may be performed based on user input, for example through a graphical user interface. For more information on the just-described use of listeners, please see the following:

Oracle 9i Net Service Administrators Guide Release 1 (9.0.1) PART No. A90 154-01.

Oracle 9i Database Administrator's Guide Released 1 (9.0.1) PART No. A90-117-01.

Thereafter, in act 30, the new instance J is automatically started in newbie computer 60J. On start up instance J automatically becomes aware (see act 31 in FIG. 4) of all existing instances A–N (e.g. by registering in an application group as discussed above), thereby to allow partial results to be exchanged as may be necessary from time to time. In this embodiment, in act 32, the instance J also makes all of the existing instances A–N become aware of itself, again for exchanging partial results as may be necessary. Depending on the embodiment, acts 31 and 32 may be omitted, for example if there is no need to exchange partial results, as in the case of an application server.

Figure 6:
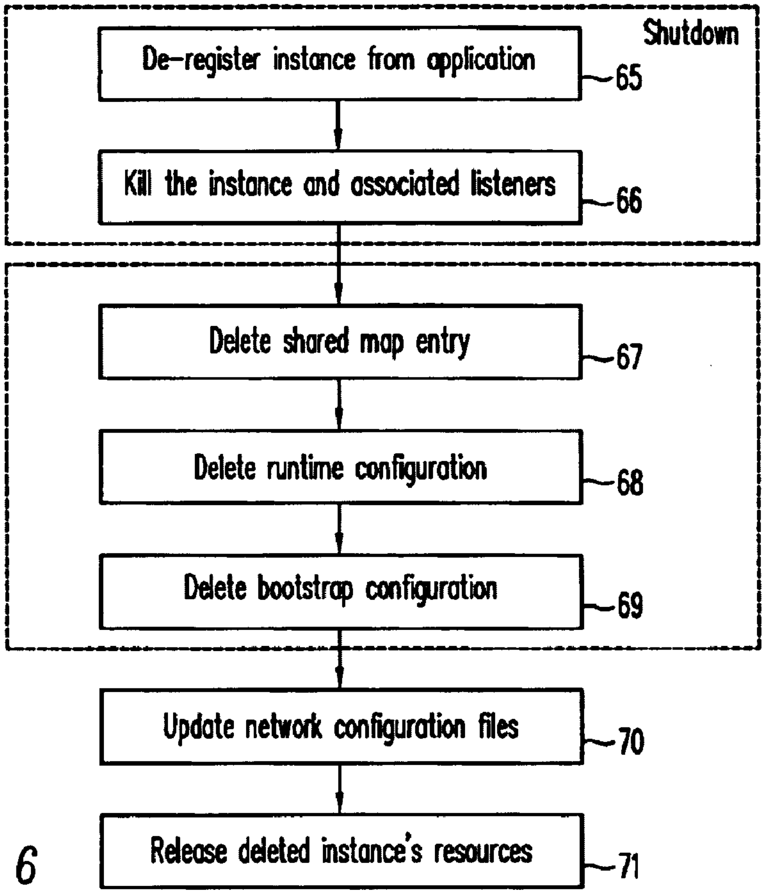

In addition to the above-described process of adding a new instance to a group of existing instances, it's also possible to delete an instance automatically, for example if the instance has become faulty. Specifically, as illustrated in FIG. 6, an instance that is to be shut down is de-registered from the application group defined in the cluster group service and killed. In this particular implementation, the de-registration (see act 65) reverses the results of acts 31 and 32 described above in reference to FIG. 4. Specifically, all of the remaining instances are made unaware of the instance to be deleted. Thereafter, in act 66, the instance to be deleted is killed, for example by issuance of a kill command. In this embodiment, act 66 is implemented as the reverse of act 30 described above.

In a similar manner, acts 67–69 illustrated in FIG. 6 are performed to delete various objects of the killed instance, and are reverse of corresponding acts 21, 10, and 13. Specifically, in act 67, an entry in the shared map is deleted (e.g. by deleting an entry for the killed instance in a map file shared across all computers). This is followed by deletion of the run time configuration in act 68. Thereafter, the bootstrap configuration is deleted in act 69 (e.g. by deleting an entry for the killed instance from a private file in each computer). Next, the network connectivity of the killed instance is deleted, by updating the network configuration files in act 70 (which is reverse of act 22). Execution of act 70 may involve deleting an entry for the killed instance from a file shared across all computers and/or from a file in a computer that described the killed instance. Next, in act 71, the deleted instances resources are released, e.g. a directory associated with the deleted instance is deleted (such as the directory ORACLE_HOME or ORACLE_BASE).

In one specific implementation, acts 10, 20 and 30 are performed for adding a new instance of a database, namely Oracle 9i. The new instance is added automatically by the starter computer programmed with a tool for obtaining certain information from the user through a graphical user interface as illustrated by acts A1–A15 described below. Another set of acts D1–D13 also described below are used by such a computer to implement acts 65–71 (for deleting an instance of the Oracle 9i database). The following description of acts A1–A15 and D1–D13 is merely illustrative of one specific implementation. One or more of the following acts may be modified or their order changed or the acts may be simply omitted, depending on the specific embodiment. Other implementations and embodiments will be apparent to the skilled artisan in view of the enclosed disclosure.

Implementation Detail for Automatically Adding an Instance:

A1. User starts the tool and chooses the "add instance management" option.

A2. Tool provides a list of currently existing databases on the cluster by looking into the shared map (which contains an entry for each instance identifying the computer on which the instance is executing.

A3. User selects the database to add an instance to. If the user doesn't have SYSDBA privileges, then tool asks for the user credentials (like user name & password).

A4. Tool validates that a database instance is running in the local computer (i.e. starter computer) by interacting with the clusterware software (such as IBM's Phoenix) that provides group services (e.g. by providing as input to the software, the name of the database), and verifies that the user's credentials are valid. Note that the database being looked up is a database on the cluster (also called "cluster database"). A cluster database is a database that has multiple instances running on nodes of the cluster, accessing that database. Also the tool verifies that daemon is UP on local computer by interacting with the clusterware software (e.g. providing the daemon name as input). If these conditions are not satisfied, the tool displays a dialog that says to the user (e.g. database administrator) what's wrong and how to correct it. For example, the tool displays a message indicating to the user the command to start up the daemon. The tool also determines the current instances-to-nodes map by looking into the shared configuration store for the chosen database.

A5. The tool uses a heuristic to construct a default name for the new instance to be added. In one example, this heuristic is based on whether the existing instance names have a common name prefix (database name prefix). If so, the tool finds the largest numeric suffix and adds one to it to construct the new instance name. Else the tool leaves the instance name field blank. Also, the tool displays a list of available nodes. This list can be either all nodes in the cluster, or just the nodes on which the chosen database doesn't have an instance (the latter is used in this implementation).

A6. The user may enter the instance name (if there was no default or user would like to name the new instance differently) and choose the node on which to add it.

A7. The tool verifies that Oracle software is already installed on the chosen node (it checks for existence of ORACLE_HOME/ bin/oracle file) and also checks that the related daemon is running by interacting with clusterware software (e.g. cluster manager) on the chosen node (e.g. by providing the daemon name as input). If these are not satisfied, the tool displays a dialog message and provides suggestions on how to correct the problem.

A8. The tool determines the Undo management mode, server parameter file name and next redo log group number by making a connection to the instance in the local computer. The tool computes the next redo log group number as MAX (redo)+1, determines the listener names configured on the node selected above in the ORACLE_HOME. In one example, listener names are kept in a file, named listener.ora. These listeners will be associated with the new instance when it is added. Also get a copy of the database objects e.g. undo tablespace or rollback segments, redo log groups, by making a connection to the instance in the local computer.

For example, the following query is made to the local instance.

1. For Undo Tablespace:

Select value from V$parameter where name='undo_tablespace';

2. For Rollback Segments:

a. First determine local instance number from instance name.

Select instance_number from gv$instance where instance_name='<local_instance_name>';

In the above query, the last term (in angle brackets) is replaced with the actual name of this instance.

b. Find rollback segment names associated with instance_number.

Select segment_name from sys.dba_rollback_segs where segment_name !='SYSTEM' and instance_num=<instanceNum>;

In the above query, the last term (in angle brackets) is replaced with the actual number obtained in the previous query.

3. For redo logs:

a. Find thread number from local instance name. Select thread# from v$thread where instance='<instanceName>';

In the above query, the last term (in angle brackets) is replaced with the actual name of this instance.

b. Find redo log groups from thread#.

Select group# from v$log where thread#=threadNum obtained in 3.a.

For more information, please refer to Oracle 9i SQL Reference Release 1 (9.0.1), part number A90125-01.

A9. Update names of the objects copied in act A8. If using automatic management, update the undo tablespace name and it's data file name else update rollback segment names in the cloned objects. The tool uses the following heuristics:

constructs undo tablespace name as "UNDOTBS" followed by n, where n=no. of existing instances +1;

constructs undo tablespace datafile name by appending "_" followed by the new instance name to the undo tablespace datafile name in the cloned object;

constructs rollback segment names by appending "_" followed by new instance name constructed in step A6 above after the rollback segments name for the local instance;

For each cloned redo log group object this tool updates the following: group number by starting with next redo log group found in step A8 and then incrementing it by 1; data file name by appending the "_" followed by new instance name.

A10. If the selected database uses raw devices, the tool replaces the data file names for the undo tablespace and redo group logs with the raw devices found in a file referred to by DBCA_RAW_CONFIG environment variable. The users can change these data file names on the user interface as well. If using the manual undo management, the users can change the default rollback segment names in the user interface.

Here the users can also change the storage properties like data file sizes, extents etc. to make the new instance less or more capable than the existing instance. Not changing the storage properties ensures that the new instance is as capable as the local instance.

A11. The tool creates the Oracle Flexible Architecture directory structure on the node selected for the new instance.

A12. The tool adds static configuration (the act A12 may be skipped if autodiscovery is used and if instances are stateless and fail when resources are insufficient):

For Windows platform: Adds an entry of the system identifier SID to the registry on the new instance's node.

For Unix platform: Adds database entry to the oratab file on the new instance's node. For more information on the oratab file, see Oracles 9i Real Application Clusters Installation and Configuration, Release 1 (9.0.1) Part No. A 89868-02.

Adds the instance-node map entry for the new instance to the shared configuration store. Information for use in the map entry comes from, e.g. Step A6 described above.

Creates orapwSID file on new instance's node by copying it from local instance's node. This file holds a password for a system user to be used for remote authentication. For more information, see Oracle 9i Database Administrator's Guide, Release 1 (9.0.1) Part No. A 90117-01.

A13. The tool creates runtime environment for the new instance as follows:

determines the instance thread number for the new instance. It is either MAX (threads)+1 or if there are holes in thread assignment, then the tool picks the first hole as the thread for the new instance;

creates the new instance thread in the database and associates it with the redo log groups database objects constructed in act A9 above;

enables the new instance thread;

if using automatic undo management, creates the undo tablespace for the new instance from the database object constructed in act A9. Else, creates the rollback segments from the database objects constructed in act A9 above;

add instance specific parameters e.g. instance_name, thread, instance_number, local_listener, undo_tablespace or rollback_segments parameters to the server parameter file, either on the local node or preferably in the shared parameter file on a raw device. The just-described "shared parameter" file is different from the previously-described "shared map." The shared parameter file is used to initialize the new instance on startup, and contains initialization parameters, such as memory requirements.

In contrast, the shared map contains, e.g. a name of a database, names of instances that make up the database, and a mapping of each instance to the node in which it runs. Such a shared map is stored in a disk shared by all nodes in one embodiment. Depending on the size of the cluster and partitions of the cluster, a single shared map may hold such information for multiple databases, and alternatively a shared map for each database may be stored separately in different shared disks.

increment the cluster_database_instances by one and max_rollback segments by the number of rollback segments created above when using manual undo management.

if not using shared parameter file, copy the updated server parameter file to all nodes (including the new instance's node) on which the cluster database has instances;

create initSID.ora file on the new instance's node; and for Windows platform, start the SID service on the new node's instance.

A14. The tool updates network configuration as follows:

adds static SID entry for the new instance to the listener.ora file on the new instance's node;

adds net service entries for the new instance to the tnsnames.ora file so that local and cross instances registration can take place when the new instance and its listener(s) are started. For a description of the service entries, the tnsnames file & local, cross registration see Oracle 9i Net Services Administrator's Guide Release 1 (9.0.1) Part No. A 90154-01. The tool copies tnsnames.ora file from all but the new instance's node, to the local instance's node, and adds the network service entries for the new instance to them and copies the file back to where they came from. The tool copies the local instance's tnsnames.ora file to the new instance's node.

Alternatively, the tool could enumerate all service entries for the database from the local instance's tnsnames.ora file, and add the enumerated entries to the new node's tnsnames.ora file.

A15. The tool starts the listener on the new instance's node, and starts the new instance on its configured node.

Implementation Detail for Automatically Deleting an Instance:

D1. User starts the tool and chooses the "delete instance management" option.

D2. Tool provides a list of currently existing databases on the cluster by looking into the shared configuration store.

D3. User selects the cluster database to delete an instance from. If the user doesn't have SYSDBA privileges, then the tool asks for the user credentials (like user name & password).

D4. Tool validates local database instance is UP by interacting with clusterware software (e.g. cluster manager) by providing a database name obtained in Step D3 as input. If not, it displays a dialog that provides instructions to be used to correct whatever is wrong. The tool determines the current instances to nodes map by looking into the shared configuration store for the chosen cluster database.

D5. The tool determines the instance names that make up the database selected above by looking into the shared configuration store. The tool finds the aliveness status of the instances by interacting with cluster manager (by providing the database name as input) and displays the instance names and their status (ACTIVE/INACTIVE) in the user interface. The tool also determines the Undo management mode and server parameter management file name by making a connection to the local instance. An ACTIVE status allows the tool to determine the database objects e.g. undo tablespace or rollback segment names, instance thread, redo log group numbers and their associated log files etc. for the instance to be deleted, else the tool deletes the static configuration only.

D6. The user selects the instance to be deleted. If the selected instance is a local instance, the tool displays a dialog saying that chosen instance should not be deleted by using the tool. In this implementation, one instance must be deleted only by using the method used to create it. Therefore, in this implementation, the user selects a remote instance for deletion, and therefore the local instance is not deleted using the tool.

Note that the tool may execute in a computer that does not have an instance, in which case the tool may ensure that if the to-be-deleted instance is the only instance then it is not deleted. In another embodiment, the tool allows deletion of any instance, even if it is the only instance left.

D7. The tool automatically determines the instance-to-node mapping from the shared configuration store. Using the node information, the tool determines if the daemon is running on it by interacting with the cluster manager on the node, by providing the daemon name as input. If the daemon is not running, the tool shows a dialog that tells the user how to start it.

D8. The tool determines the instance-specific database objects, e.g. instance thread number, undo tablespace name and server parameters for the instance to be deleted. If the instance to be deleted was UP, the tool runs SQL queries, else deletes all parameters that have SID prefix that is same as the instance to be deleted. Also, the tool determines the names of the listeners associated with the instance to be deleted, e.g. looking for these names in the file listener.ora on the to-be-deleted instance's node. This can be done irrespective of whether the instance or the listener was UP or not.

D9. The tool brings down the runtime environment as follows:

- if the instance to be deleted was UP, the tool shuts it down using IMMEDIATE mode. This deregisters the instance from the cluster database group and the instance from its listener.
- stops all the listener(s) associated with the instance to be deleted. This is a forced operation, and the tool ignores all possible errors.

D10. The tool deletes the static configurations as follows:

- deletes the instance-to-node map entry from the shared configuration store;
- for Unix platform: deletes the cluster database entry from the oratab file on the deleted instance's node;
- deletes the initSID.ora, orapwSID, and lkDB_NAME files from the ORACLE_HOME/dbs directory for Unix or alternatively deletes the initSID.ora and PWdSID.ora files from ORACLE_BASE\database directory for Windows platforms on the deleted instance's node; See Oracle 9i Real Application Clusters Installation and Configuration, Release 1 (9.0.1) Part No. A 89868-02.
- deletes the Oracle Flexible Architecture (OFA) folder (e.g. ORACLE HOME/admin/<DB_NAME>) and ORACLE HOME/oradata folder from the deleted instance's node; and
- for Windows platform only, deletes the SID entry from the registry on deleted instance's node.

D11. The tool deletes the database objects as follows:

- from the instance thread number found in act D8 above, the tool determines the redo log group numbers and their associated redo log files. The tool disables the instance thread and drops the redo log files; and
- The tool, using UNDO Management mode, drops the undo tablespace found in act D8, else executes SQL statements to find the rollback segments and drop them for the deleted instance.

D12. The tool updates the server parameters file as follows:

- decrements the cluster_database_instances count by 1;
- deletes the deleted instance specific parameters e.g. thread number, instance_name, instance_number, undo_tablespace (if using automatic undo management) or rollback_segments (if using manual undo management);
- if using manual undo management, decrements the max_rollback_segments parameter by the number of rollback segments deleted in act D11; and
- If not using shared parameter file, copy the updated server parameter file to all the remaining instances' nodes.

D13. The tool updates the Network Configuration as follows:

- deletes the SID entry from the listener.ora file on the deleted instance's node;
- deletes the network service entries for the deleted instance from all instances' nodes (including the deleted instance's node) of the cluster database as follows:

Copy tnsnames.ora file from all instance's nodes (including the deleted instance's node) to the local instance's node. Delete the network service entries for the deleted instance from them and copy the file back to where they came from. For the deleted instance's node, the tool deletes all the network service entries for the database.

The above-described acts D1–D13 leave the deleted instance's environment in a clean state as it was presented to the tool before adding an instance.

Prior to the addition of an instance, a user may need to add a node to a cluster, e.g. at a clusterware layer.

The method for adding nodes at the clusterware layer is operating-system dependent. On UNIX, unless the user has preconfigured clusterware to accommodate additional nodes, the user cannot dynamically add nodes. Therefore, the user must stop the clusterware and reconfigure the cluster to accommodate additional nodes. Thereafter the user can add new nodes without stopping the database because UNIX cluster has been already preconfigured to accommodate additional nodes.

To prepare a new node for addition to the preconfigured cluster, the user ensures that it is an exact clone of the existing nodes in terms of vendor operating system, clusterware software, and so on. Then the user performs the following tasks U1 and U2 in the order shown to add a new node at the clusterware layer on UNIX.

U1. The user connects the new node's hardware to the existing cluster. This includes electrical connections, network interconnects, shared disk subsystem connections, and so on, using hardware vendor documentation for details on this step.

U2. The user installs the cluster software by referring to the vendor's installation procedures, and uses cluster vendor documentation for procedures to make the new node an active member of the cluster.

If the user's platform supports a cluster file system and the user is not using raw devices for cluster database, then need to create raw devices as described next. As part of the preinstallation steps before installing the Oracle database software on the new node, the user creates at least two new disk volumes to accommodate the redo logs for the new instance. For an example, refer to Oracle9i Real Application Clusters Installation and Configuration (that is incorporated by reference herein in its entirety) for the requirements for these redo logs and the preinstallation steps. This document also describes other information such as how raw partitions are to be created on Windows platforms.

Next, the user makes the disk volumes for the redo logs the same size as the redo log volumes that were configured for existing nodes' instances. Refer to clusterware vendor documentation for procedures on creating disk volumes and raw devices.

If the database to which the user wants to add a new node and instance uses automatic undo management, then the user creates an additional raw volume for the new undo tablespace for the new instance. After completing this step, the user proceeds to adding an instance of the database.

Instead of adding a node in the Unix environment, a user may add a node in Windows environments. Assume that there is already a Windows cluster running the database. Also assume that the new node uses the same operating system that is running on the existing nodes of the cluster. In other words, Microsoft Windows NT 4.0 or Windows 2000 is installed on all the nodes in the cluster. If so, the user performs the following tasks W1–W4 in the order shown, to add a new node at the clusterware layer on Windows NT and Windows 2000.

W1. The user connects the new node's hardware to the existing cluster. This includes making electrical connections, network interconnects, shared disk subsystem connections, and so on. Refer to hardware vendor documentation for details on this step.

W2. The user installs cluster software as follows:

If using operating system vendor supplied clusterware on the existing nodes, also install this vendor software on the new node using vendor's installation procedures.

However, if using Oracle Corporation's reference clusterware/operating system-dependent (OSD) software on the existing nodes of the cluster, the user must also install these Oracle OSD clusterware on the new node using the Cluster Setup Wizard. To do this, the user must perform the following steps from one of the existing nodes before running the wizard:

O1. If using the Virtual Interface Architecture (VIA) interconnect on the existing cluster, the user must make sure that VIA interconnect is also installed on the new node.

O2. If the user has a private interconnect network on the existing cluster, the user must make sure that the private interconnect network is also installed on the new node.

O3. The user must determine the disk drive on which the cluster software was installed on the existing nodes, and make sure that at least 2 MB of free space on the same drive is available on the new node to install the OSD clusterware and the Object Link Manager.

O4. The user must make sure that one can execute following from each of the existing nodes of the cluster:

NET USE \\host_name\C$ where the host_name is the public network name of the new node. The user has administrative privileges on each node if the operating system responds with:

Command completed successfully.

O5. To install the Oracle OSD clusterware when the new node already has a version of the vendor OSD clusterware installed, the user must make sure the vendor OSD clusterware is stopped. Otherwise, the user must continue to the next step.

O6. The user must insert CD number one from the Oracle9i release 1 (9.0.1) CD set into the new node's CD-ROM drive.

O7. The user must navigate to the PREINSTALL\CLUSTERSETUP directory, for example:

cd \PREINSTALL\CLUSTERSETUP

O8. The user then runs the Cluster Setup Wizard by entering the following from the \PREINSTALL\CLUSTERSETUP directory:

clustersetup

O9. The cluster setup wizard displays its Welcome Page. Click Next to proceed.

O10. The user checks the Node Addition option and clicks Next.

O11. The user provides a public name for the new node to be added. If the existing cluster also uses a high speed private network, the user provides a name for the private network interface for the new node and clicks Next.

O12. The user clicks finish.

As part of the preinstall requirements before installing the software on a node for a database, the user must create raw disk partitions, e.g. create at least two new disk partitions to accommodate the redo logs for the new instance. The user may make these disk partitions the same size as the redo log partitions that were configured for the existing nodes' instances. If the database to which a node is to be added uses automatic undo management, then the user creates an additional logical partition for the undo tablespace.

For Windows 2000 only, the user should use a basic disk as an extended partition for creating raw partitions.

Thereafter, to create partitions, the user performs the following tasks from one of the existing nodes of the cluster:

P1. The user starts Disk Administrator using the path: Start >Program >Administrative Tools >Disk Administrator P2. The user clicks inside an unallocated part of the extended partition.

P3. The user chooses Create from the Partition menu. A dialog box appears in which the user enters the size of the partition. The user must ensure that the same sizes used on existing nodes are used here.

P4. The user clicks on the newly created partition and selects Assign Drive Letter from the Tool menu.

P5. The user selects Don't Assign Drive Letter, and click OK.

P6. The user repeats the last four steps, Steps P2 through P5, for the second and any additional partitions P7. The user selects Commit Changes Now from the Partition menu to save the new partition information.

P8. For Windows NT only, the user may need to reboot all the nodes in the cluster if using a pre-4.0 Service Pack, to make all of the nodes recognize the new partitions.

After creating disk partitions as described above in reference to act P1–P8, the user must create links to the partitions so the existing nodes recognize these links. In addition, the new node should also recognize the pre-existing symbolic links to logical drives as well as the new links. To create these links, the user must perform the following acts L1–L5 from one of the existing nodes:

L1. The user must start the Object Link Manager by typing the following from the % ORACLE_HOME %\bin directory:

GUIOracleOBJManager

The Object Link Manager automatically detects the symbolic links to the logical drives and displays them in a graphical user interface (GUI).

L2. Next, the user identifies in the GUI of the Object Link Manager the disk and partition numbers for the partitions that were created by acts P1–P8, and performs the following tasks:

a. right-clicks next to the box under the New Link column and enters the link name for the first partition.

b. repeats step a. for the second and any additional partitions.

For example, if database name is db and it consists of two instances running on two nodes and the user is adding a third instance on the third node, link names for redo logs are db_redo3__1, db_redo3__2, and so on. If the existing database uses automatic undo management, then the user enters the link name for the logical partition for the undo tablespace. In the just-described example, link name for the undo tablespace will be db_undotbs3.

3. The user selects Commit from the Options menu, to create the new links on the current node.

4. The user selects Sync Nodes from the Options menu, to make the new links visible to the existing nodes of the cluster.

5. The user selects Exit from the Options menu to exit the Object Link Manager.

At this point, the user has added the new node to the cluster at the clusterware layer. To add a node and an instance to an existing cluster at the database layer, it is necessary to install the database software on the new node, perform certain post-installation steps discussed below, and add a database instance on the new node.

Specifically, to install the database software (such as Oracle) on the new node, the user must perform the following acts I1–I9.

I1. If the platform supports a cluster file system, then the user proceeds to post-installation discussed below.

I2. On the new node, the user inserts the database software CD-ROM into the computer, e.g., inserts Oracle 9i release 1 (9.0.1) CD-ROM into the new node's CD-ROM drive.

I3. The user runs the installer (e.g. Oracle Universal Installer) using one of the following procedures. On UNIX, the user runs the installer by executing the runInstaller command from the root directory of the first Oracle CD. On Windows NT and Windows 2000, run the Installer by executing the setup.exe command.

I4. On the File Locations page in the Path field under the Destination heading, the user enters the ORACLE_HOME into which the database software is to be installed, e.g. Oracle Enterprise Edition and Real Application Clusters software. The ORACLE_HOME entered should be the same as the ORACLE_HOME that the existing nodes use.

I5. On the Available Products page, the user selects database, e.g. Oracle 9i.

I6. On the Install Types page, the user selects Enterprise Edition. The Installer displays the Database Configuration page.

I7. The user follows the user interface instructions to install the same products and options that were installed on the existing nodes. Or the user may select the Software Only configuration option on the Database Configuration page.

I8. On the Node Selection page, the user selects only the current or new node name because the software is already on other pre-existing node names.

I9. When the installation of the database software is completed, the user must run the post installation script root.sh, then exit the installer and proceed to post-installation.

From the new node, the user performs post-installation as follows. The user configures a new listener for the node, e.g. by running the Oracle Net Configuration Assistant from the bin directory in ORACLE_HOME.

Then the user completes any post-installation steps for their platform by referring to platform-specific database documentation.

To add an instance on the new node, the user goes to one of the existing nodes that has a running instance and performs the following acts K1–K13 (which are described for an example of Oracle as the database).

Figure 7:
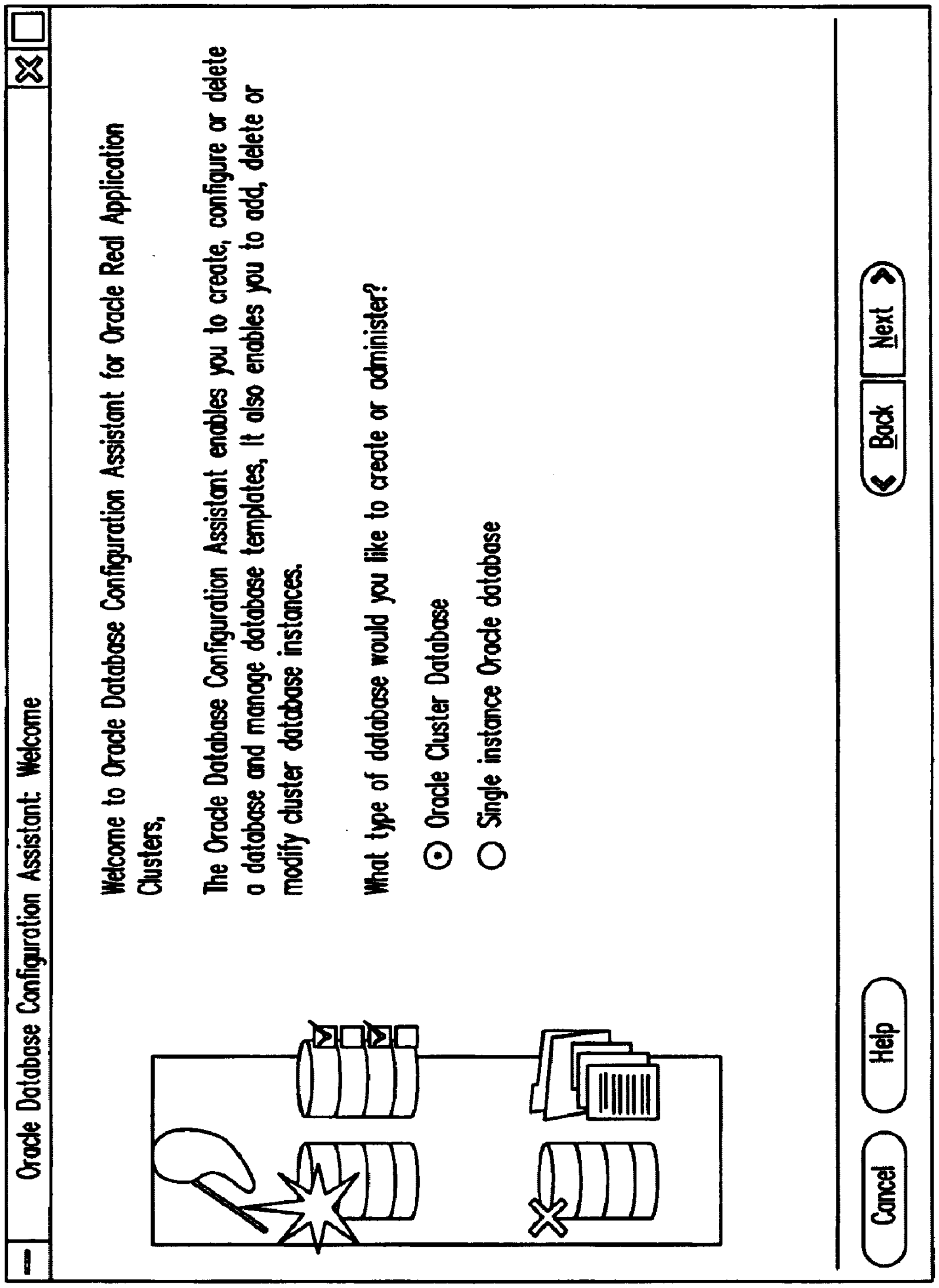

K1. The user makes sure the Global Services Daemon (GSD) is running on all the existing nodes as well as on the new node. If the GSD is not running: on UNIX, enter the command $ORACLE_HOME/bin/gsd to start it;

On Windows NT and Windows 2000, enter the following command % ORACLE_HOME%\bin\gsdservice-start to start the OracleGSDService:

K2. The user launches the Oracle Database Configuration Assistant by typing dbca in the bin directory in $ORACLE_HOME on UNIX, or on Windows NT and Windows 2000, choose Start >Programs >Oracle for Windows NT/2000 - [HOME_NAME] >Database Administration>Database Configuration Assistant. The DBCA wizard starts and displays the Welcome Page for Real Application Clusters shown in FIG. 7. If the Welcome Page for Real Application Clusters does not display, it means the Oracle Database Configuration Assistant was unable to:

- Communicate with the Cluster Manager (CM) software on Windows NT or Windows 2000
- Detect the Global Cache Service (GCS) software or the lists of nodes in the cluster on UNIX operating systems To resolve this, refer to Clusterware vendor's operating system-dependent documentation and then restart the DBCA.

Figure 8:
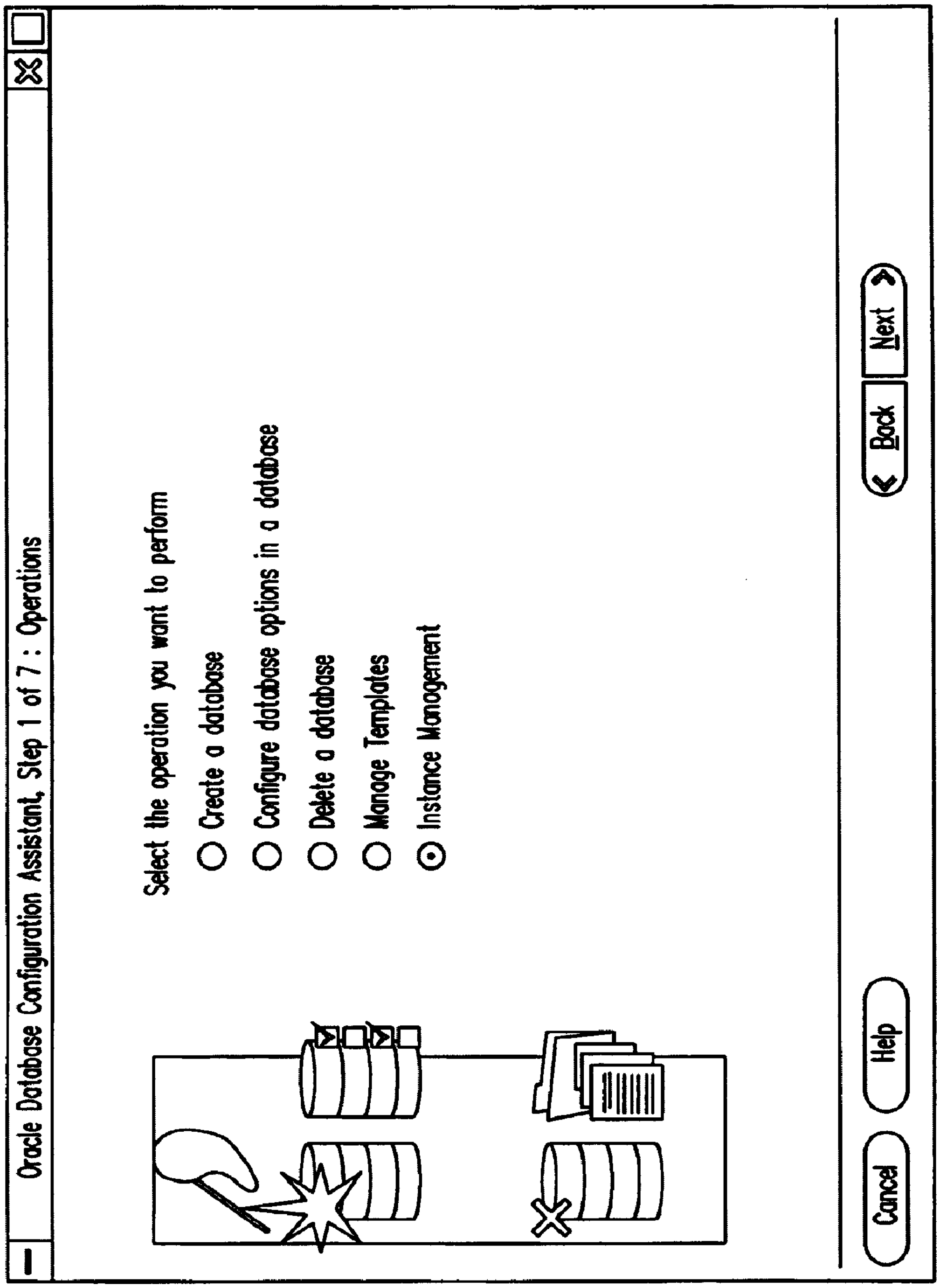

K3. The user selects the Oracle Real Application Clusters Database option and click Next. After the user click Next, the DBCA displays the Operations Page as shown in FIG. 8.

Figure 9:
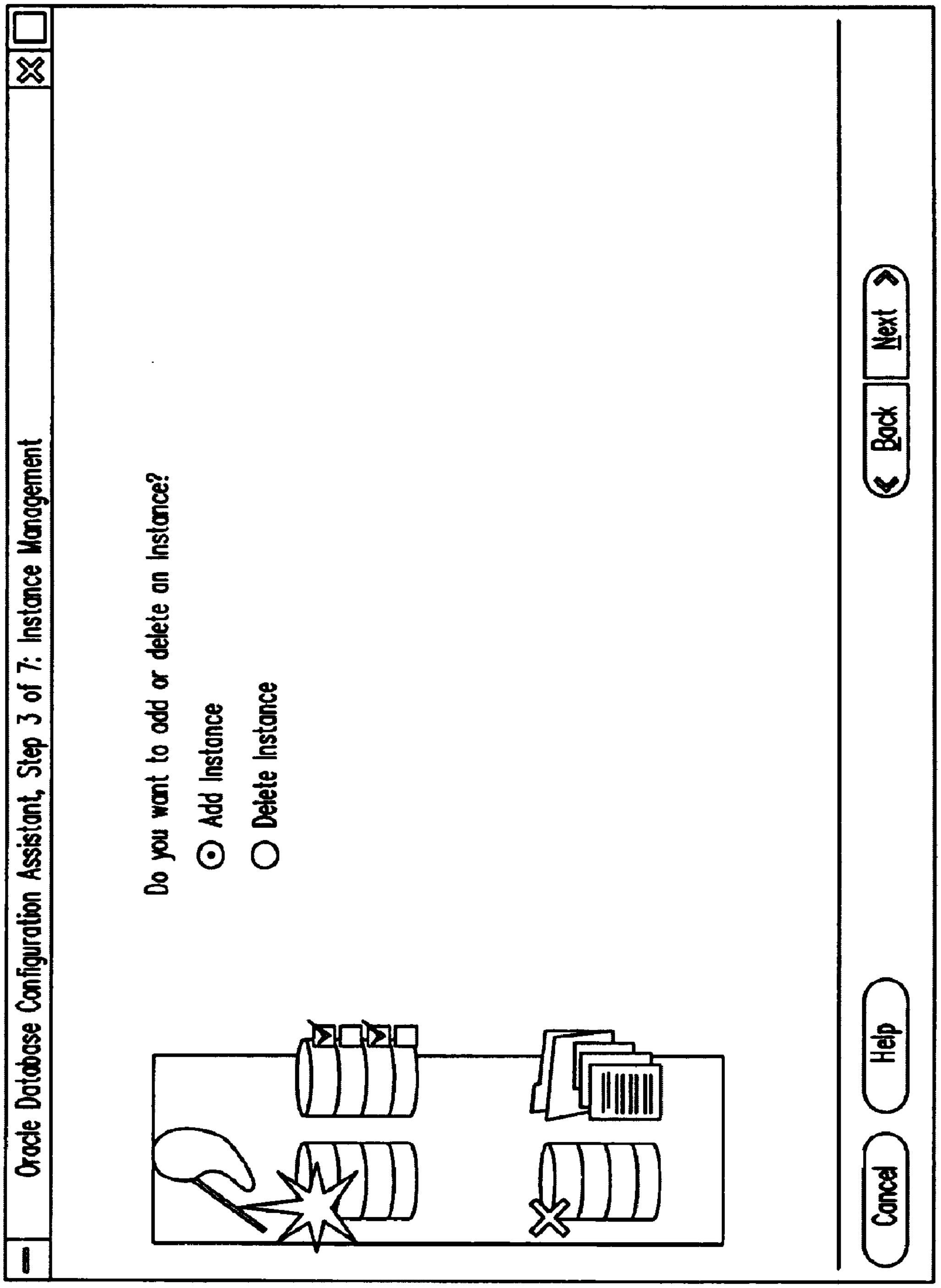

K4. After the user clicks Next, the DBCA displays the Instance Management as illustrated in FIG. 9.

Figure 10:
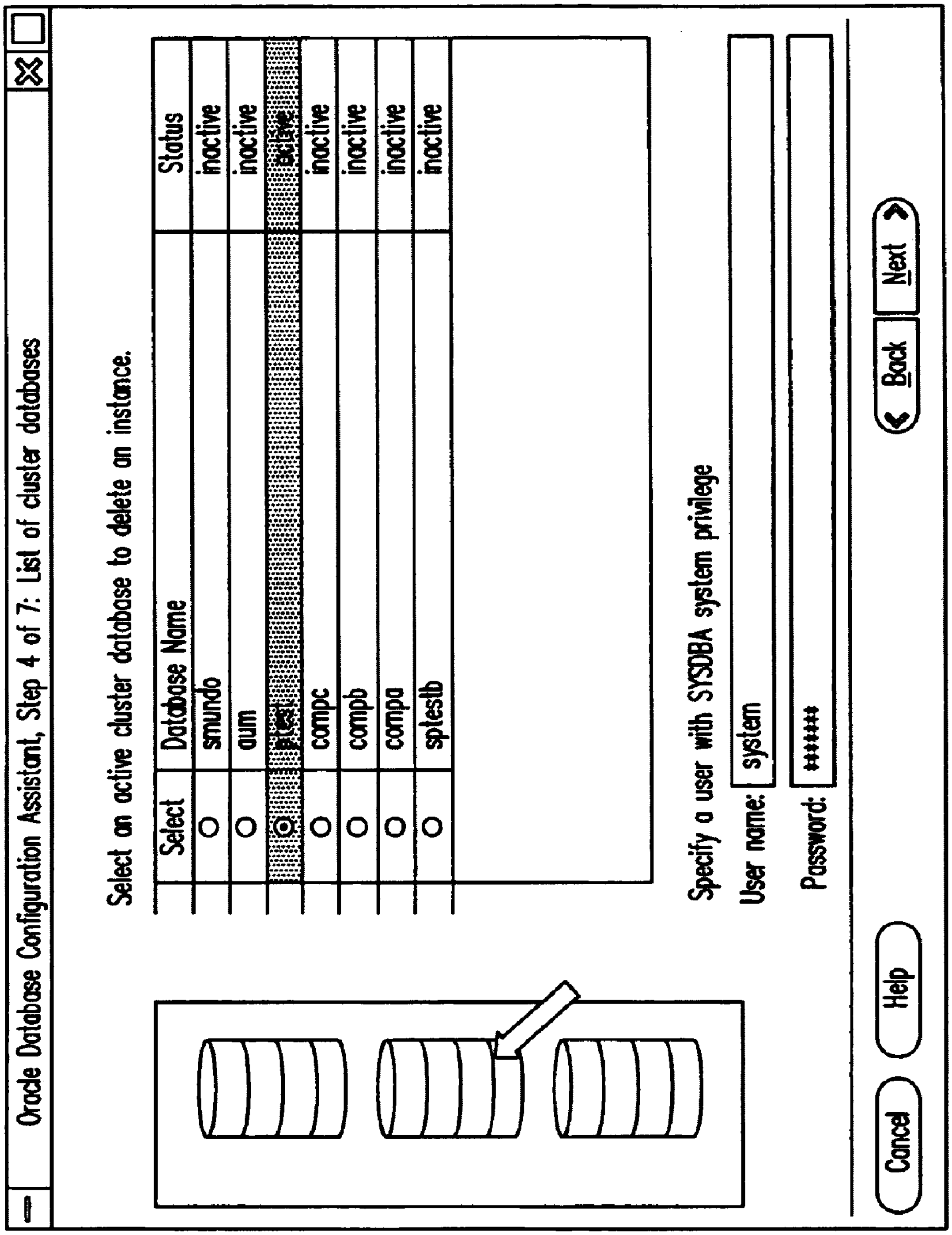

K5. After the user clicks Next, the DBCA displays the List of Databases and their current status, such as ACTIVE, or INACTIVE, as shown in FIG. 10 (which illustrates a list of databases).

Figure 11:
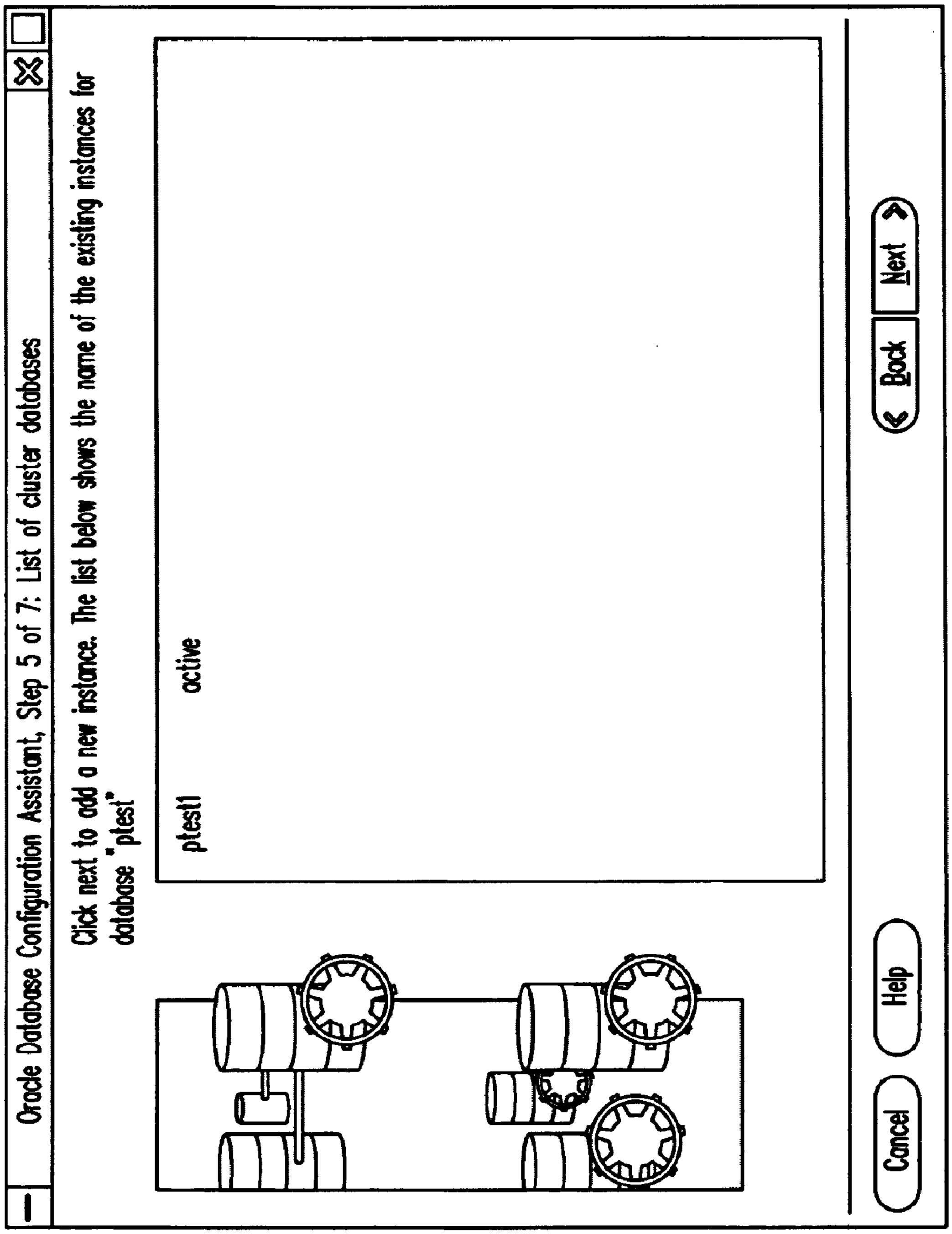

K6. The user selects an active Real Application Clusters database name to add an instance to from the List of Databases page. If the user ID is not operating-system authenticated, the DBCA also prompts for a user ID and password for a database user that has SYSDBA privileges. If prompted, the user must enter a valid user ID and password and click Next. After the user clicks Next, the DBCA displays the List of Instances Page showing the names of the instances that exist for the selected Real Application Clusters database as shown in FIG. 11 (which illustrates a list of instances).

Figure 12:
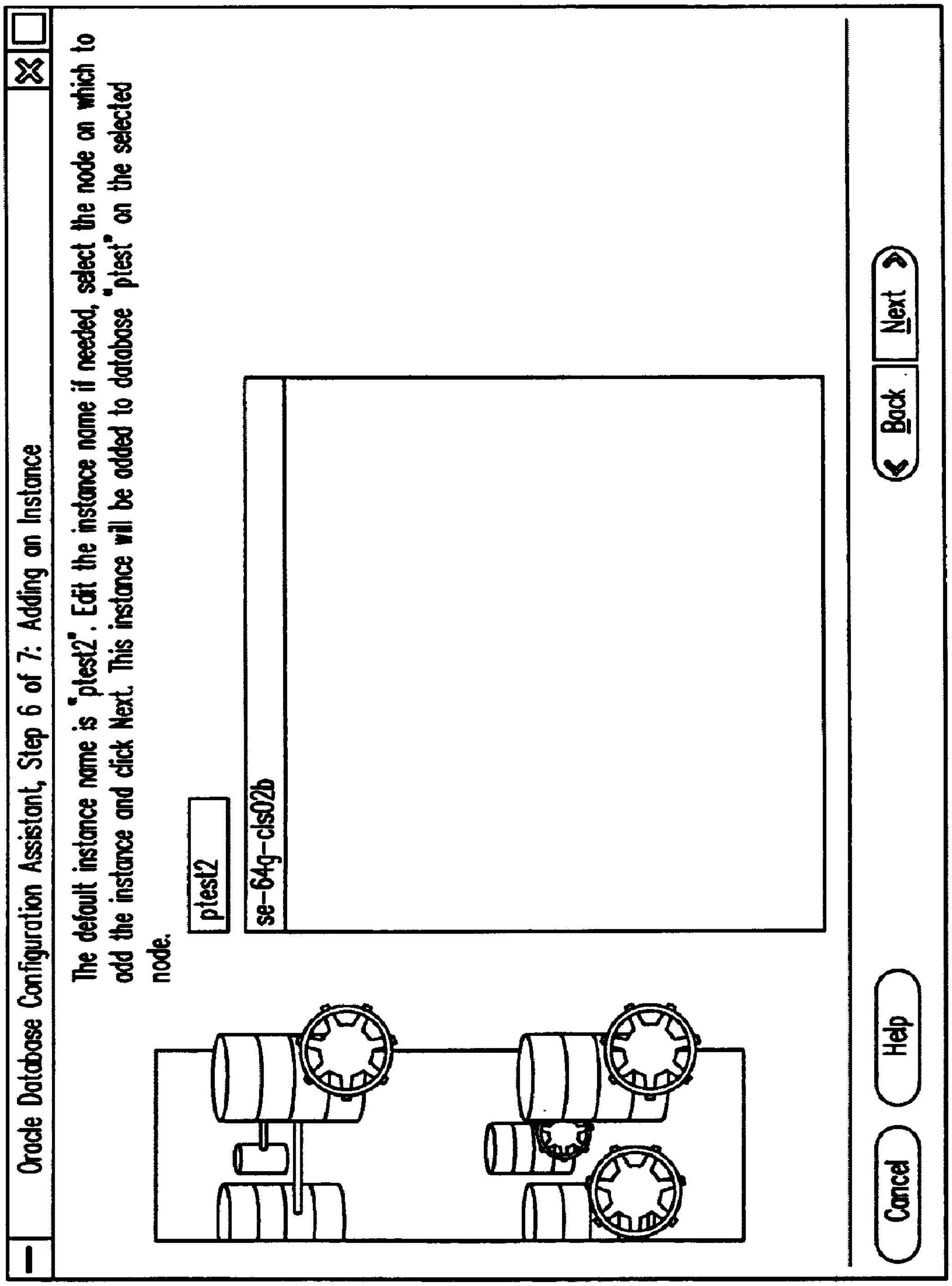

K7. After the user clicks Next, the DBCA displays the Adding an Instance page as shown in FIG. 12.

Figure 13:
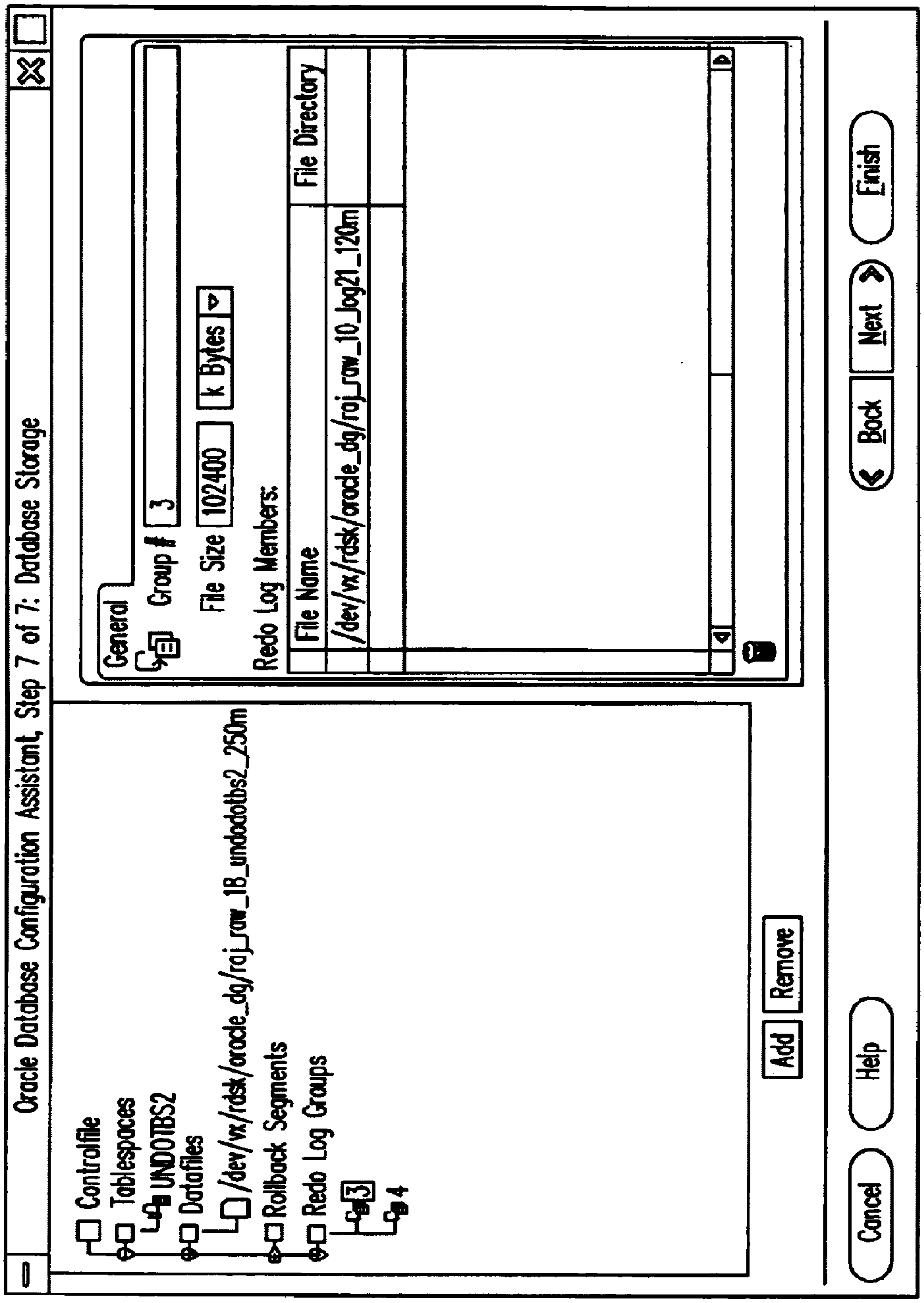

K8. The user enters the instance name in the field at the top of this page if the instance name that the DBCA provides does not match the user's existing instance name sequence. Then the user selects the new node name from the list and clicks Next. After clicking Next, the DBCA displays the Storage Page as shown in FIG. 13.

K9. If the database uses automatic undo management, and the platform supports a cluster file system, then the user can skip the rest of this act K9 unless there is a need to change the default undo tablespace data file name that the DBCA provides. Otherwise, the user selects the Tablespaces folder and expands it. The user then selects the undo tablespace storage object. Another dialog appears on the right-hand side, and the user changes the default data file name to the raw device name (or changes it to the cluster file system file name, if the user does not want to use the default name) for the tablespace.

K10. If the user's database uses rollback undo management, then the user selects the Rollback Segment folder to change the rollback segment names if the user does not want to use the default rollback segment names that the DBCA provides.

K11. If the platform supports a cluster file system, then the user skips the rest of this act K11 unless there is a need to change the default redo log group file names. Otherwise, the user selects the Redo Log Groups folder and expands it. For each redo log group number selected, the DBCA displays another dialog box. For UNIX, the user enters the raw device name that was created in the section, as described above, in the File Name field. On Windows NT or Windows 2000 the user enters the symbolic link name that was created as described above in reference to acts P1–P8.

K12. The user repeats the previous act K11 for all other redo log groups.

Figure 14:
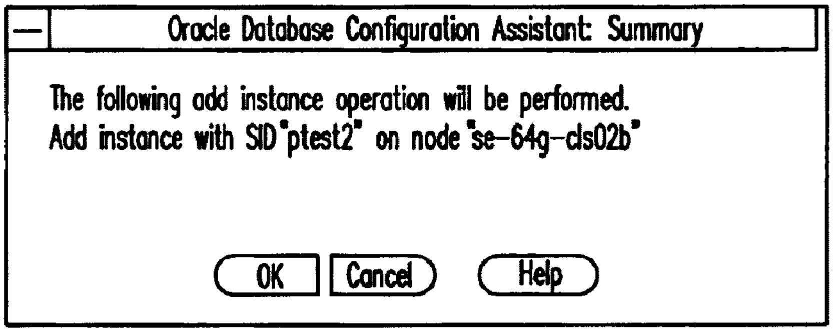
FIGS. 7–19 illustrate screens for a graphical user interface used to receive user input in one implementation.

K13. Thereafter the user clicks finish. After clicking Finish, the DBCA displays a summary page, as illustrated in FIG. 14.

On the user clicking OK, the DBCA displays a progress dialog that shows the DBCA performing the instance addition operation during which the DBCA automatically adds the instance and creates the instance's Net configuration and adds listeners if needed (as described above in reference to acts A1–A15). When the DBCA completes the instance addition operation, the DBCA displays a dialog asking whether the user wants to perform another operation. The user may click No and exit the DBCA.

At this point, the user has accomplished the following: created a new database instance on the new node; created the new instance's required services for Windows NT or Windows 2000; configured Oracle Net; and started the required services for Windows NT or Windows 2000; and started the new instance and its listeners.

To delete an instance, the user may perform the following acts R1–R5.

Figure 15:
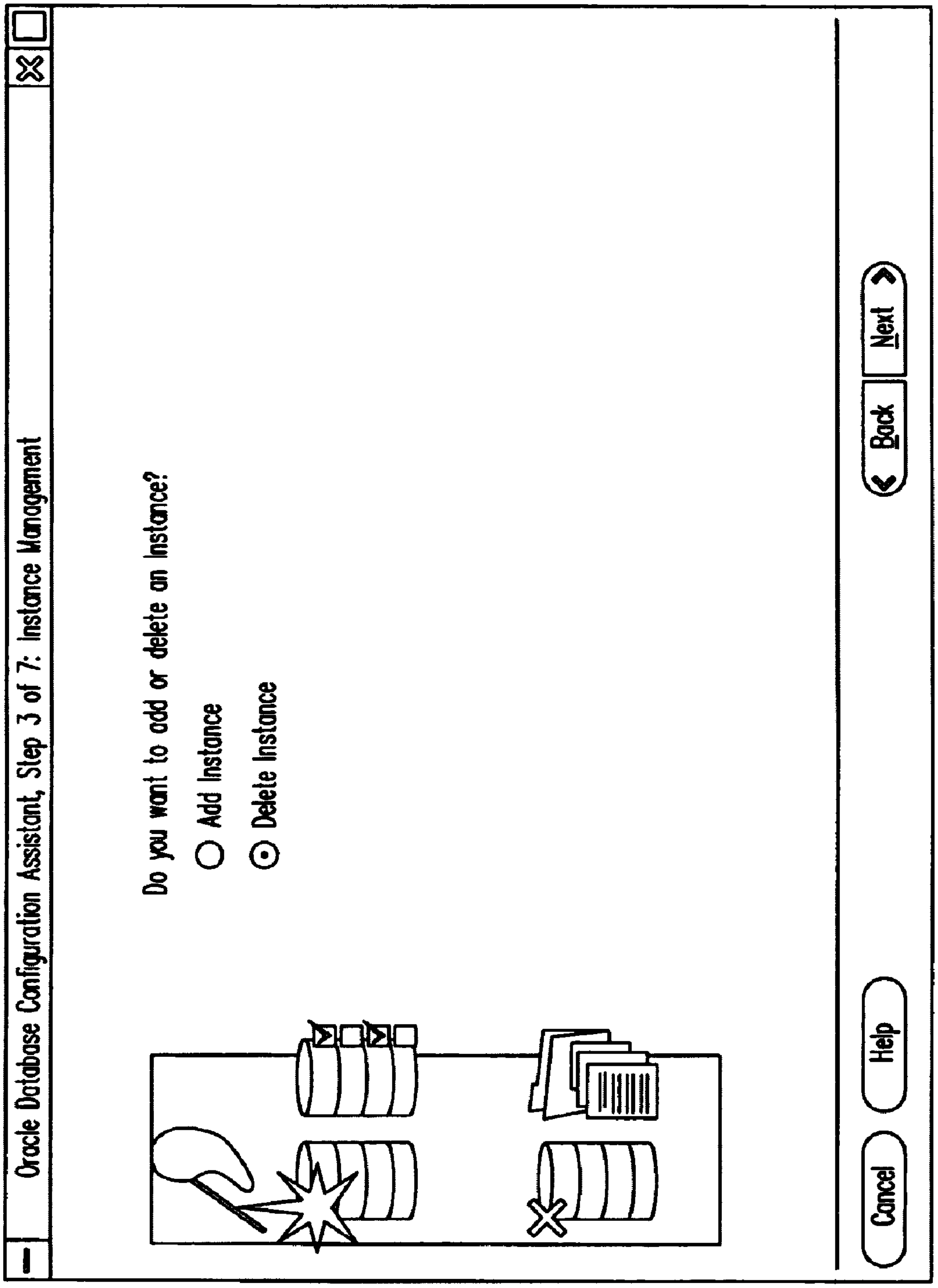

R1. The user goes to the DBCA Operations Page shown in FIG. 8, selects Instance Management and clicks Next. After the user clicks Next, the DBCA displays the Instance Management Page as illustrated in FIG. 15.

Figure 16:
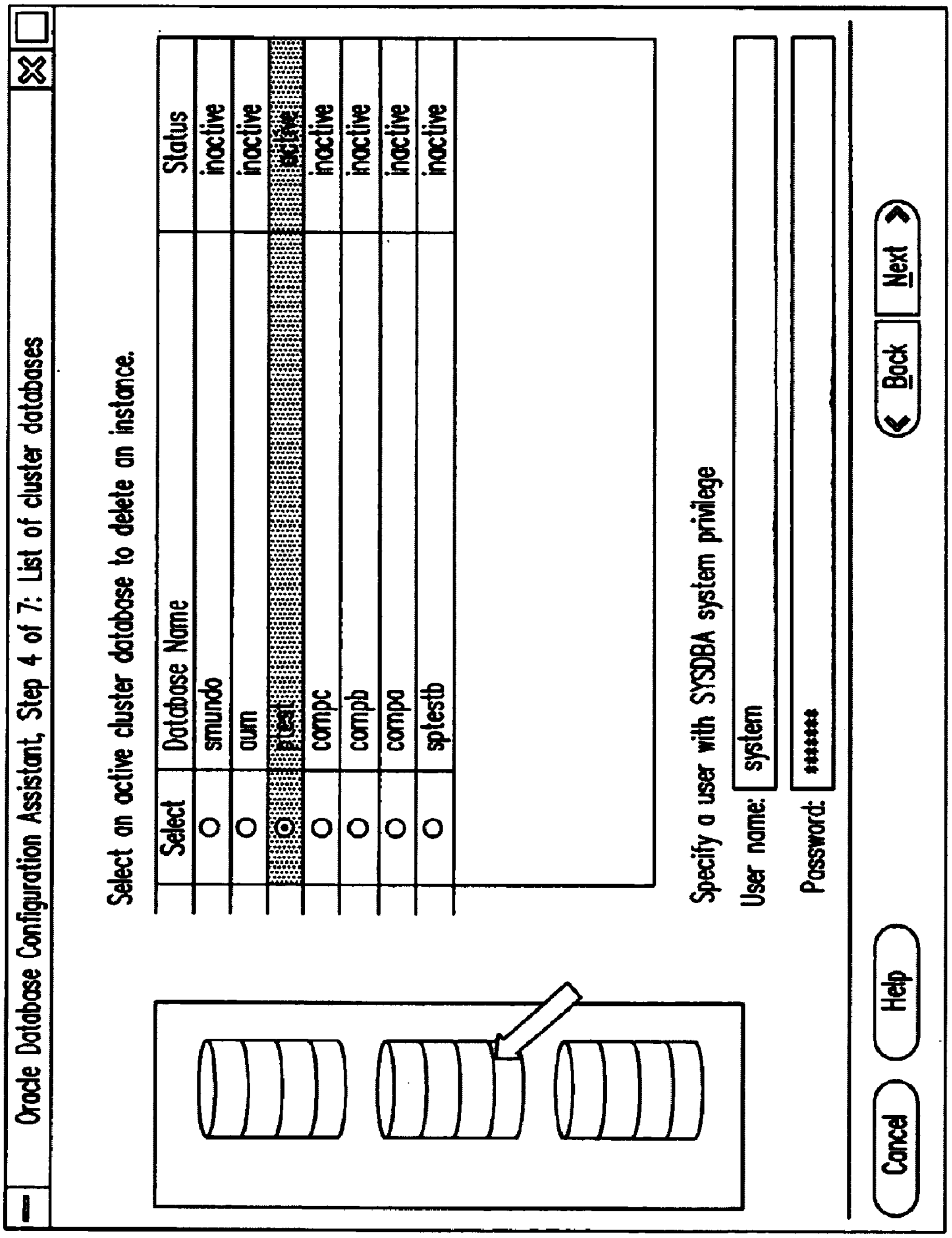

R2. The user selects the Delete Instance option and clicks Next. After the user clicks Next, the DBCA displays the List of Databases page as illustrated in FIG. 16.

Figure 17:
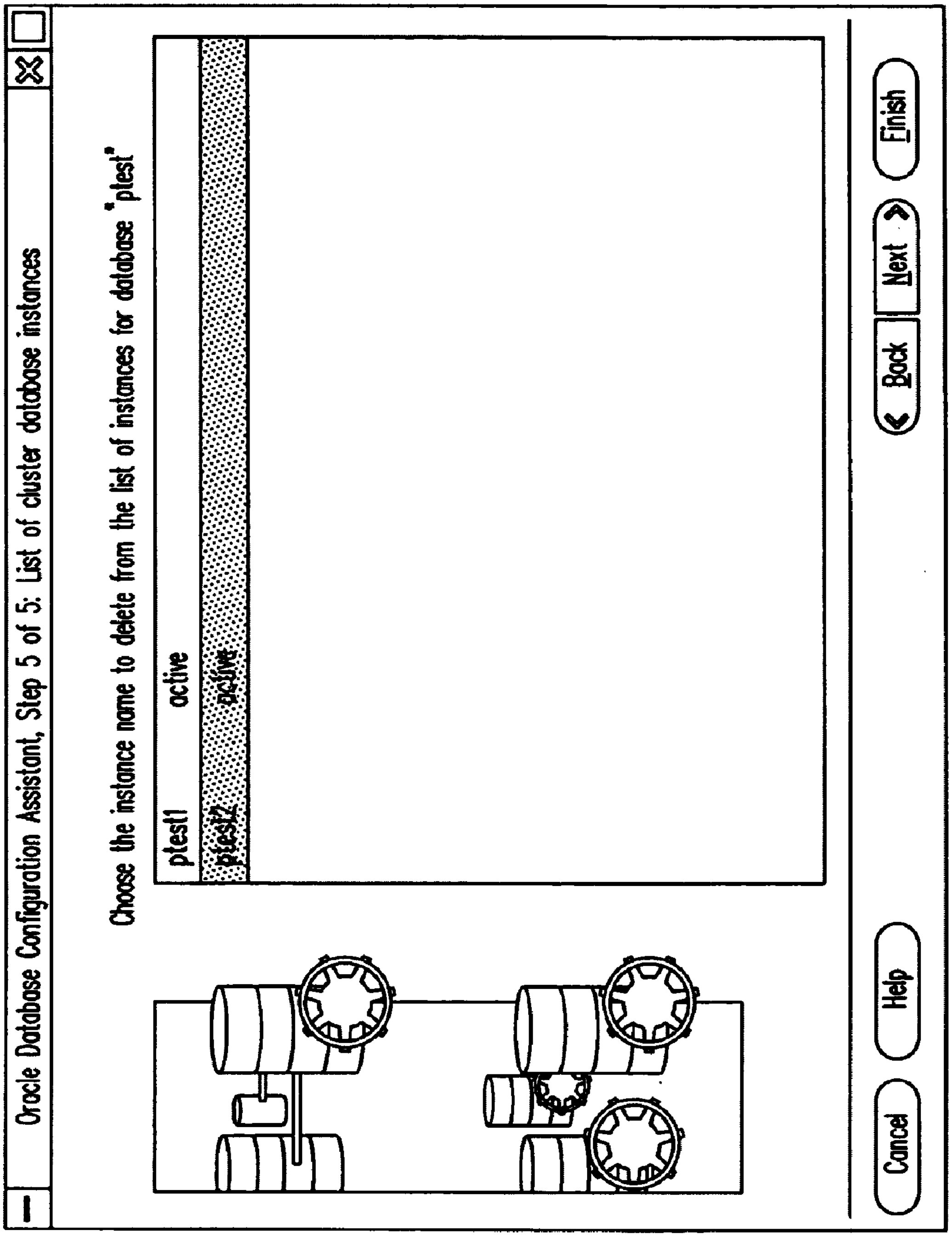

R3. The user select a database from which to delete an instance. If the user ID is not operating-system authenticated, then the DBCA also prompts for a user ID and password for a database user that has SYSDBA privileges. If the DBCA prompts for this, then the user enters a valid user ID and password and clicks Next. After the user clicks Next, the DBCA displays the List of Instances Page as illustrated in FIG. 17. The List of Instances Page shows the instances associated with the database that the user selected as well as the status of each instance.

Figure 18:
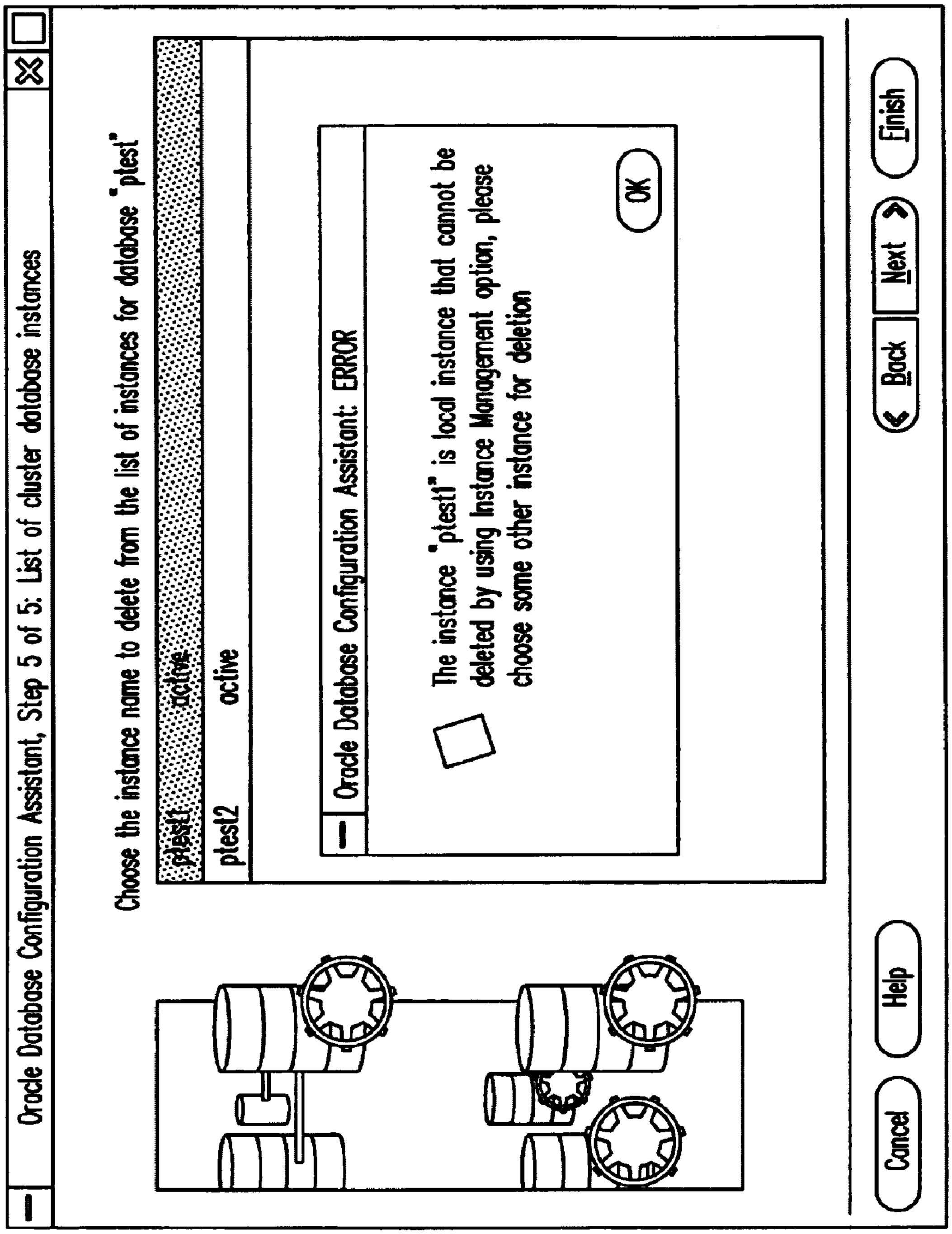

R4. The user selects the instance to be deleted and clicks Finish. If the user selects the local instance, the DBCA displays a warning as shown in FIG. 18.

Figure 19:
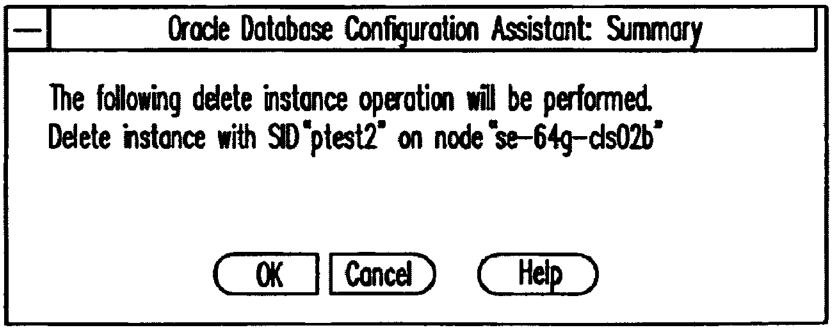

To proceed with the operation, the user clicks OK on the warning dialog and selects an instance other than the local instance and clicks Finish. The DBCA displays a summary dialog as shown in FIG. 19.

R5. The user clicks OK on the summary dialog. After clicking OK, the DBCA displays a progress dialog that shows the DBCA performing the instance deletion operation automatically during which the DBCA removes the instance and the instance's Net configuration (as described above in reference to acts D1–D13). When the DBCA completes the deletion operation, the DBCA displays a dialog asking whether the user wants to perform another operation. The user may click No and exit the DBCA.

At this point, the user has accomplished the following: stopped the listeners associated with the selected instance; deleted the selected database instance from the instance's configured node; deleted the selected instance's services for Windows NT or Windows 2000; removed the Oracle Net configuration; and deleted the Oracle Flexible Architecture directory structure from the instance's configured node.

Numerous modifications and adaptations of the embodiments described herein will be apparent to the skilled artisan in view of the disclosure. For example, Appendices A and B describe manual methods for adding an instance and deleting an instance as described herein. Accordingly, numerous such modifications of the embodiments, examples and implementations are encompassed by the attached claims.

The invention claimed is:

1. A computer-implemented method for managing multiple instances of an application executing in a plurality of computers connected by a network, the method comprising:

creating a new object for use by a new instance of the application, using an existing object currently being used by an existing instance of the application, said existing instance being one of the multiple instances of the application;

setting up connectivity between the new instance and the network; and starting execution of the new instance of the application;

wherein the new instance of the application uses the new object, and the connectivity to access a resource shared by the multiple instances of the application; and wherein each of the multiple instances of the application comprises a plurality of processes that are executing during performance of said creating, said setting up and said starting;

wherein said creating, said setting up and said starting are performed automatically in response to an instruction to add the new instance; and wherein the new object is required by the new instance to access the resource.

2. The method of claim 1 wherein said creating comprises:

making a copy of said existing object; and renaming the copy using name of the new instance of the application.

3. The method of claim 1 wherein said creating comprises:

automatically choosing a name for the new instance of the application.

4. The method of claim 1, wherein said setting up connectivity comprises:

adding an entry for the new instance to a file in a computer to describe the new instance.

5. The method of claim 4, wherein said computer is hereinafter "first computer" and wherein said creating, setting up connectivity, and starting execution are automatically performed in a second computer, and said act of setting up connectivity further comprising:

said first computer communicating with said second computer.

6. The method of claim 1, wherein said creating, setting up connectivity, and starting execution are automatically performed in a first computer, the method further comprising:

automatically displaying a list of computers in said plurality; and receiving from a user a selection of a second computer in said list.

7. The method of claim 6 wherein:

each computer in said list does not have any instance of said application.

8. The method of claim 6 wherein:

at least one computer in said list already has at least one instance of said application.

9. The method of claim 6 further comprising:

installing software for said application on said second computer if said second computer does not have said software.

10. The method of claim 6 further comprising:

setting up resources for said new instance in said second computer.

11. The method of claim 1, wherein said act of setting up connectivity comprises:

adding an entry for the new instance to a file shared across all computers.

12. The method of claim 1 further comprising:

adding an entry for the new instance to a private file in each computer.

13. The method of claim 1 wherein said act of creating new object comprises:

creating an entry for the new instance in a map file shared across all computers;

wherein the map file identifies which instances are executing on which computers.

14. The method of claim 13 wherein:

the shared map identifies a mapping between said instances of the application and computers in a cluster.

15. The method of claim 1 further comprising:

making the new instance of the application more powerful or less powerful than the existing instance of the application.

16. The method of claim 1 wherein:

said resource comprises static configuration, the static configuration including information that remains in existence even after power is turned off to a computer having one of the instances.

17. The method of claim 1 further comprising:

setting up at least one additional resource needed to bootstrap the new instance of the application.

18. A computer system comprising a plurality of computers and a shared resource, the computer system comprising:

means for creating a new object for a new instance of an application using an existing object of an existing instance of the application;

means for setting up connectivity between the new instance of the application and a network connected to the plurality of computers; and means for starting execution of the new instance of the application, such that the new instance uses the new object and the connectivity to access the shared resource;

wherein said means for creating, said means for setting up and said means for starting are automatically invoked in response to an instruction to add the new instance; and wherein the new object is required by the new instance to access the shared resource.

19. The computer system of claim 18 wherein said means for creating comprises:

means for copying said existing object; and means for renaming the copy using a name of the new instance of the application.

20. The computer system of claim 18 further comprising:

means for shutting down an instance (hereinafter "killed instance") of the application;

means for deleting connectivity between the killed instance and the network; and means for deleting an object of the killed instance.

* * * * *